(12) United States Patent
Leung et al.

(10) Patent No.: US 10,542,839 B2
(45) Date of Patent: Jan. 28, 2020

(54) COFFEE MAKING APPLIANCE

(71) Applicants: Anthony Kit Lun Leung, Hong Kong (CN); Kam Fai Fung, Hong Kong (CN); Benjamin Lai, Hong Kong (CN)

(72) Inventors: Anthony Kit Lun Leung, Hong Kong (CN); Kam Fai Fung, Hong Kong (CN); Benjamin Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 0 days.

(21) Appl. No.: 15/979,884

(22) Filed: May 15, 2018

(65) Prior Publication Data

US 2018/0325303 A1 Nov. 15, 2018

Related U.S. Application Data

(63) Continuation-in-part of application No. 14/984,513, filed on Dec. 30, 2015, now Pat. No. 10,004,354.

(51) Int. Cl.
| | |
|---|---|
| *A47J 31/42* | (2006.01) |
| *A47J 31/44* | (2006.01) |
| *A47J 31/46* | (2006.01) |
| *A47J 31/06* | (2006.01) |
| *A23F 5/26* | (2006.01) |

(52) U.S. Cl.
CPC ............ *A47J 31/42* (2013.01); *A23F 5/26* (2013.01); *A47J 31/06* (2013.01); *A47J 31/4425* (2013.01); *A47J 31/465* (2013.01); *A47J 31/468* (2018.08)

(58) Field of Classification Search
CPC .. A47J 31/06; A47J 31/22; A47J 31/42; A47J 31/465; A47J 31/468; A47J 31/4425; A23F 5/26
See application file for complete search history.

(56) References Cited

U.S. PATENT DOCUMENTS

| | | |
|---|---|---|
| 1,789,334 A | 1/1931 | Englung |
| 2,090,634 A | 8/1937 | Meeker |
| 2,422,944 A | 6/1947 | Bogoslowsky |
| 2,671,617 A | 3/1954 | Talge |
| 2,866,400 A | 12/1958 | Cornelison |
| 2,900,140 A | 8/1959 | Schuhmann et al. |
| 3,025,781 A | 3/1962 | Bossi |
| 3,233,535 A | 2/1966 | Fowlie |
| 3,282,703 A | 11/1966 | Broadhurst |
| 3,482,790 A | 12/1969 | Boster |
| 3,812,773 A | 5/1974 | Hultsch |
| 3,967,546 A | 7/1976 | Cailliot |

(Continued)

*Primary Examiner* — Anthony J Weier
(74) *Attorney, Agent, or Firm* — Grogan, Tuccillo & Vanderleeden, LLP

(57) ABSTRACT

A coffee making appliance includes a housing having a base for supporting a container configured to receive brewed coffee and a reservoir for receiving water to be heated. A hopper is configured to receive a quantity of whole coffee beans and is positioned adjacent a grinder that is itself configured to transform the whole coffee beans into ground coffee. A passageway is formed in the housing for channeling the ground coffee from the grinder to a brewing chamber. A pump configured to supply the water from said reservoir to said brewing chamber via a brew path and the brew path then directs said heated water over the passageway, thereby cleaning the passageway of particulates of the ground coffee.

3 Claims, 27 Drawing Sheets

(56) References Cited

U.S. PATENT DOCUMENTS

| | | |
|---|---|---|
| 4,464,982 A | 8/1984 | Leuschner et al. |
| 4,962,693 A | 10/1990 | Miwa et al. |
| 5,193,438 A | 3/1993 | Courtois |
| 5,224,414 A | 7/1993 | Hunt |
| 5,265,517 A | 11/1993 | Gilbert |
| 5,285,705 A | 2/1994 | Buttle et al. |
| 5,340,597 A | 8/1994 | Gilbert |
| 6,085,638 A | 7/2000 | Mork et al. |
| 7,469,627 B2 | 12/2008 | Li |
| 8,431,175 B2 | 4/2013 | Yoakim et al. |
| 8,512,784 B2 | 8/2013 | Denisart et al. |
| 8,658,232 B2 | 2/2014 | Yoakim et al. |
| 8,739,687 B1 | 6/2014 | Tacklind et al. |
| 8,813,634 B2 | 8/2014 | Yoakim et al. |
| 9,021,938 B2 | 5/2015 | Duvall |
| 9,095,236 B2 | 8/2015 | Perentes et al. |
| 9,226,611 B2 | 1/2016 | Yoakim et al. |
| 2003/0025012 A1 | 2/2003 | Lassota |
| 2006/0254428 A1 | 11/2006 | Glucksman et al. |
| 2010/0288777 A1 | 11/2010 | White et al. |
| 2011/0003046 A1 | 1/2011 | Yoakim et al. |
| 2011/0189362 A1 | 8/2011 | Denisart et al. |
| 2012/0121779 A1 | 5/2012 | Lai et al. |
| 2012/0183659 A1 | 7/2012 | Hulett et al. |
| 2013/0001339 A1 | 1/2013 | Hoare et al. |
| 2013/0133520 A1 | 5/2013 | Hulett et al. |
| 2014/0242239 A1 | 8/2014 | Boggavarapu |
| 2014/0326142 A1 | 11/2014 | Etter et al. |
| 2014/0332101 A1 | 11/2014 | Etter et al. |
| 2015/0135966 A1 | 5/2015 | Hulett et al. |
| 2015/0157168 A1* | 6/2015 | Burrows ............. A47J 31/0576 426/231 |

\* cited by examiner

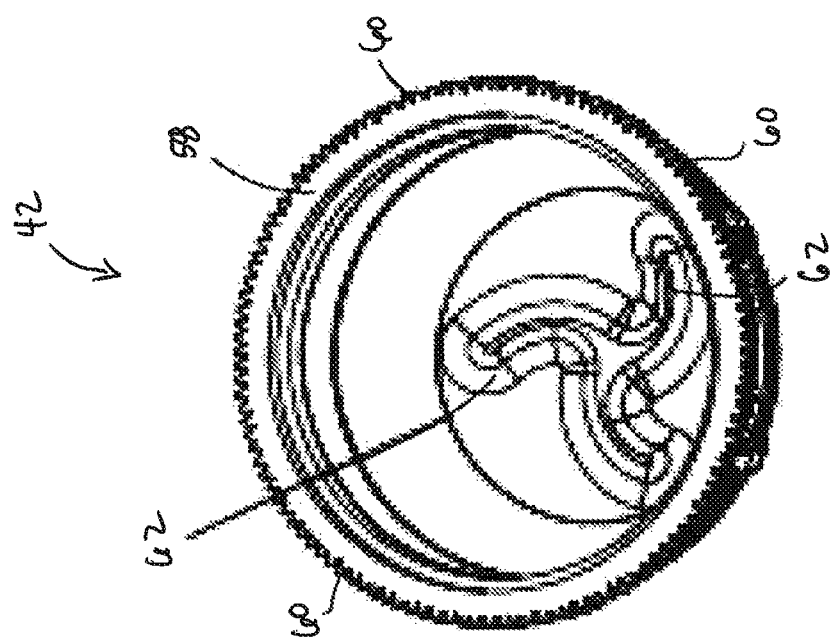
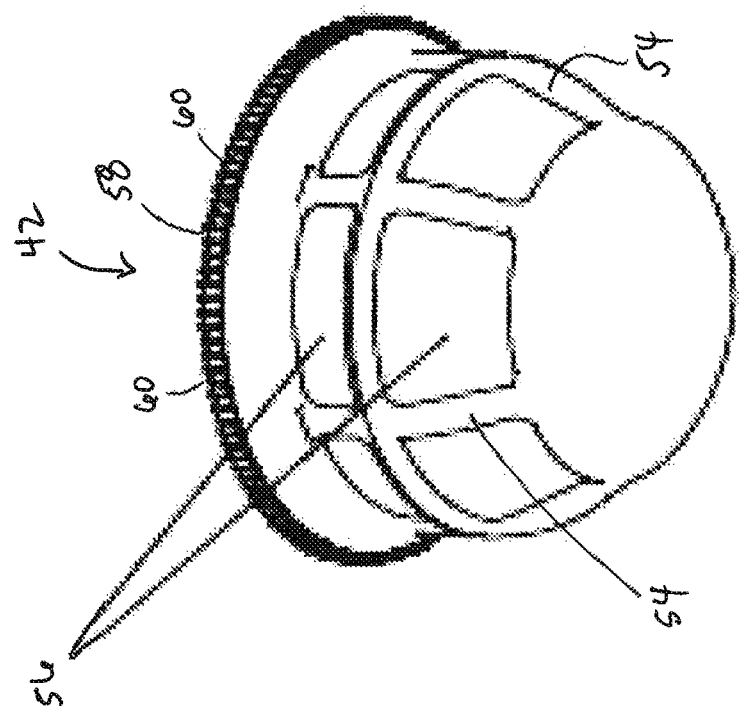

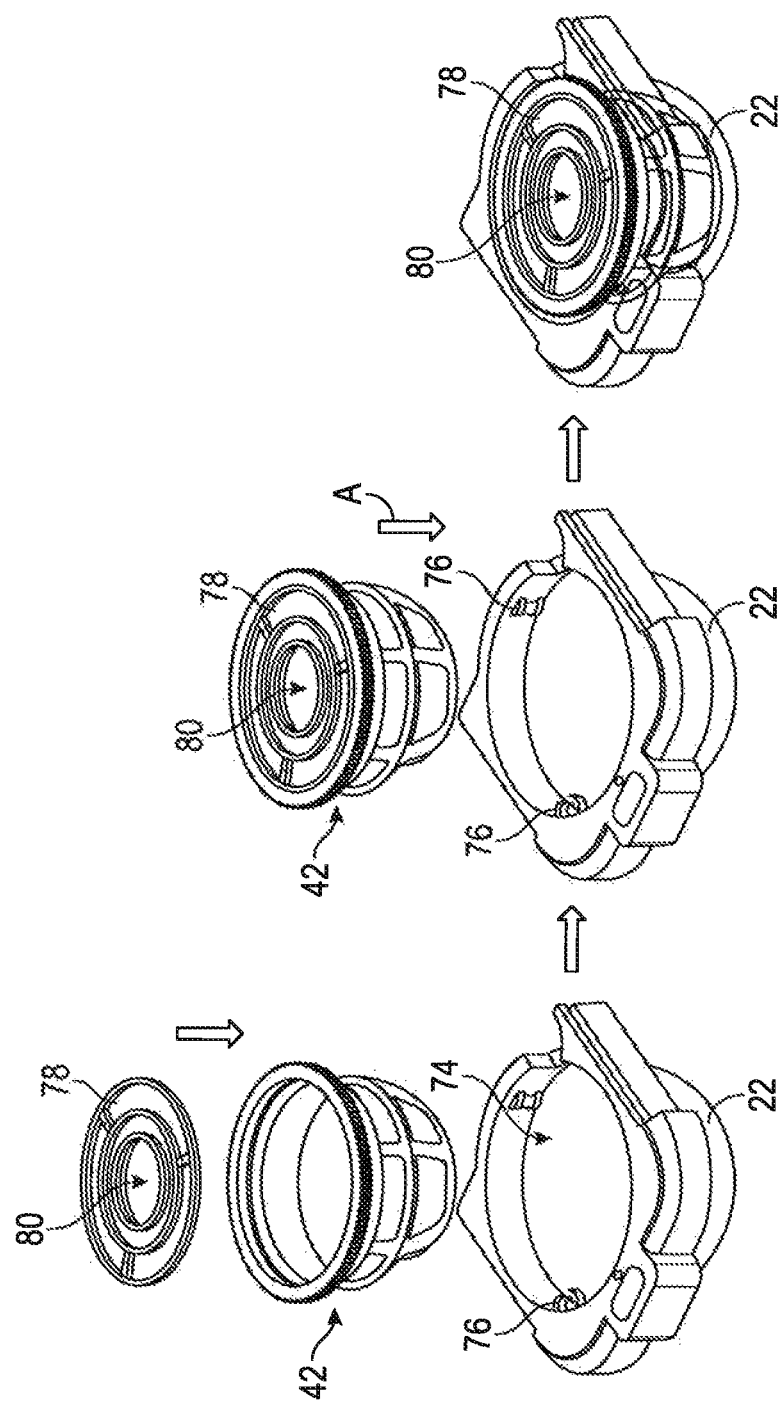

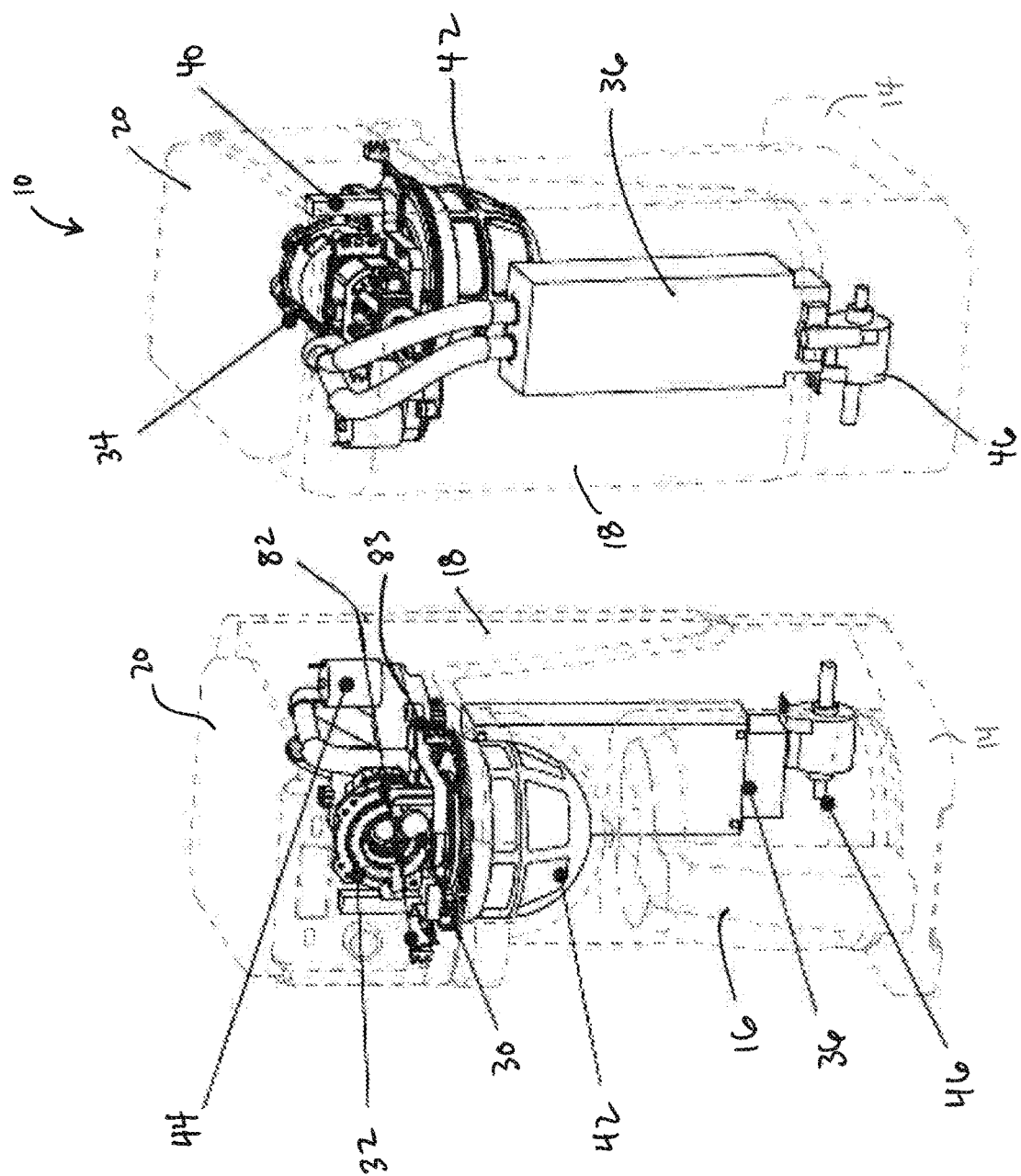

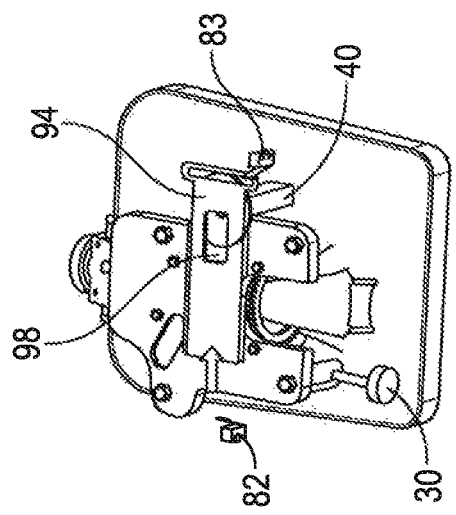
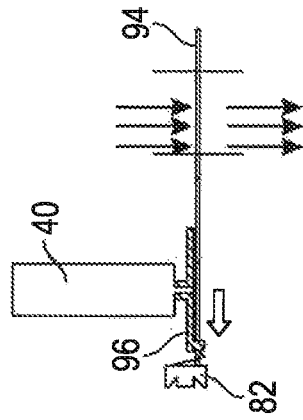
FIG. 23
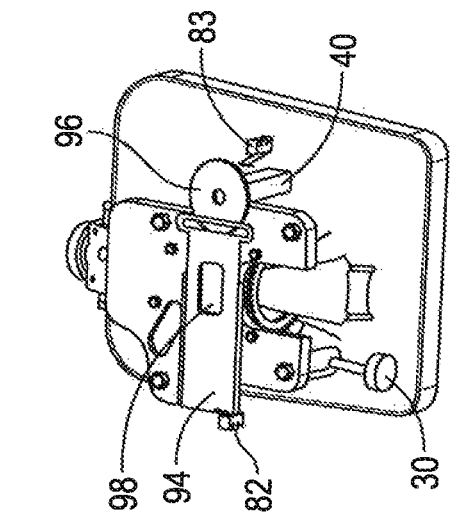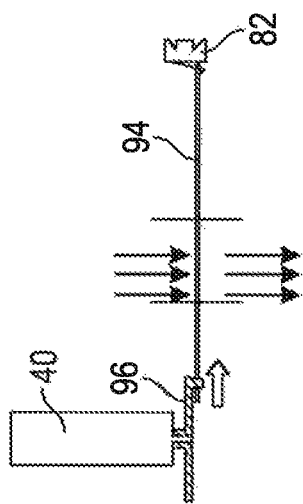
FIG. 24

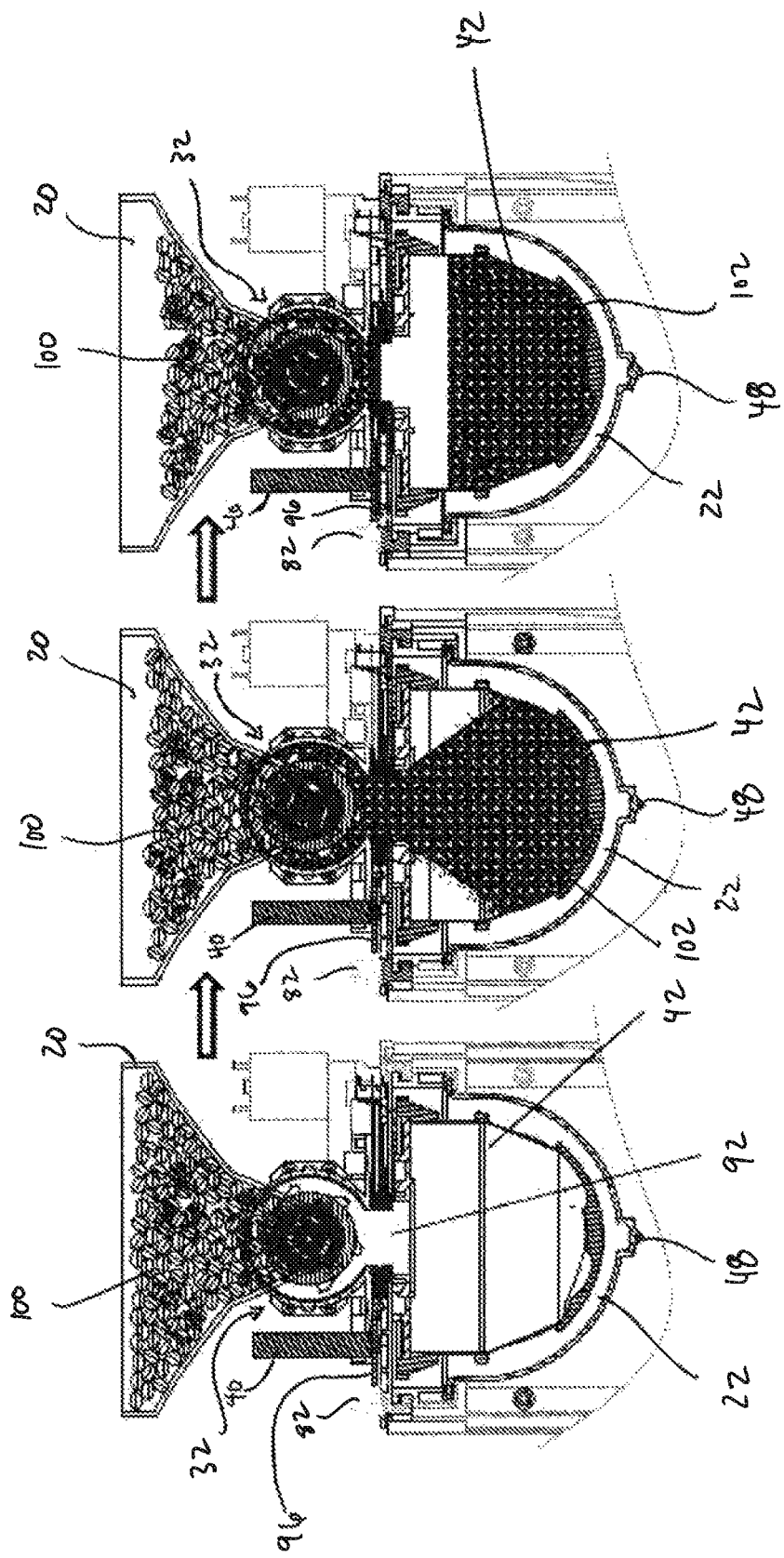

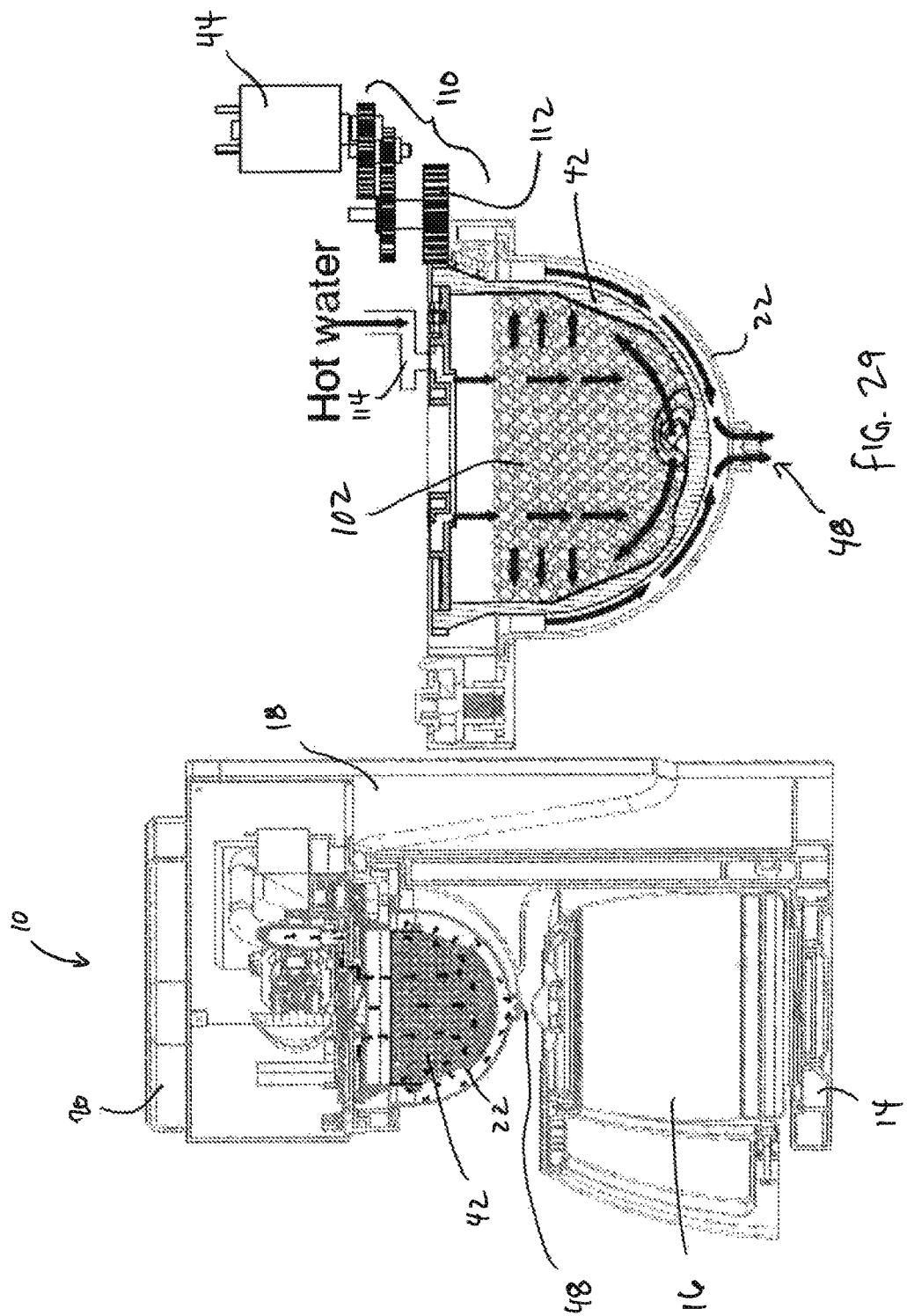

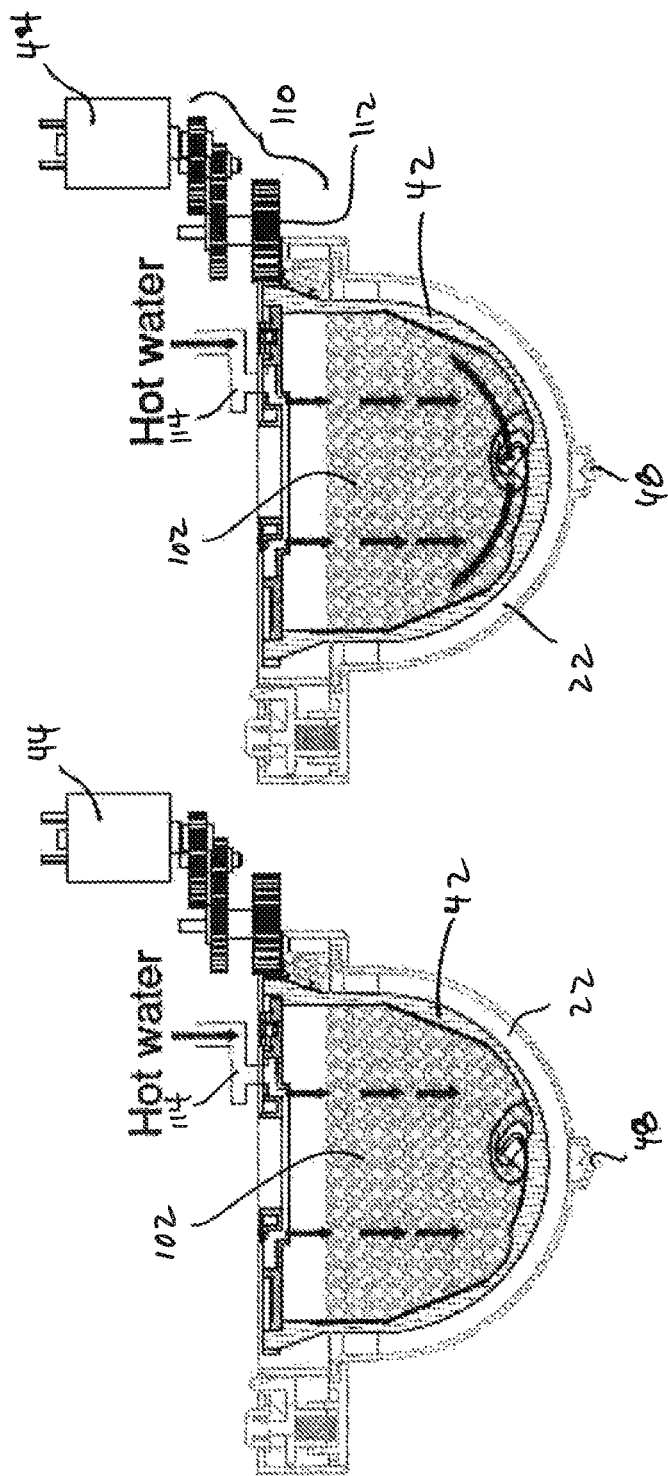

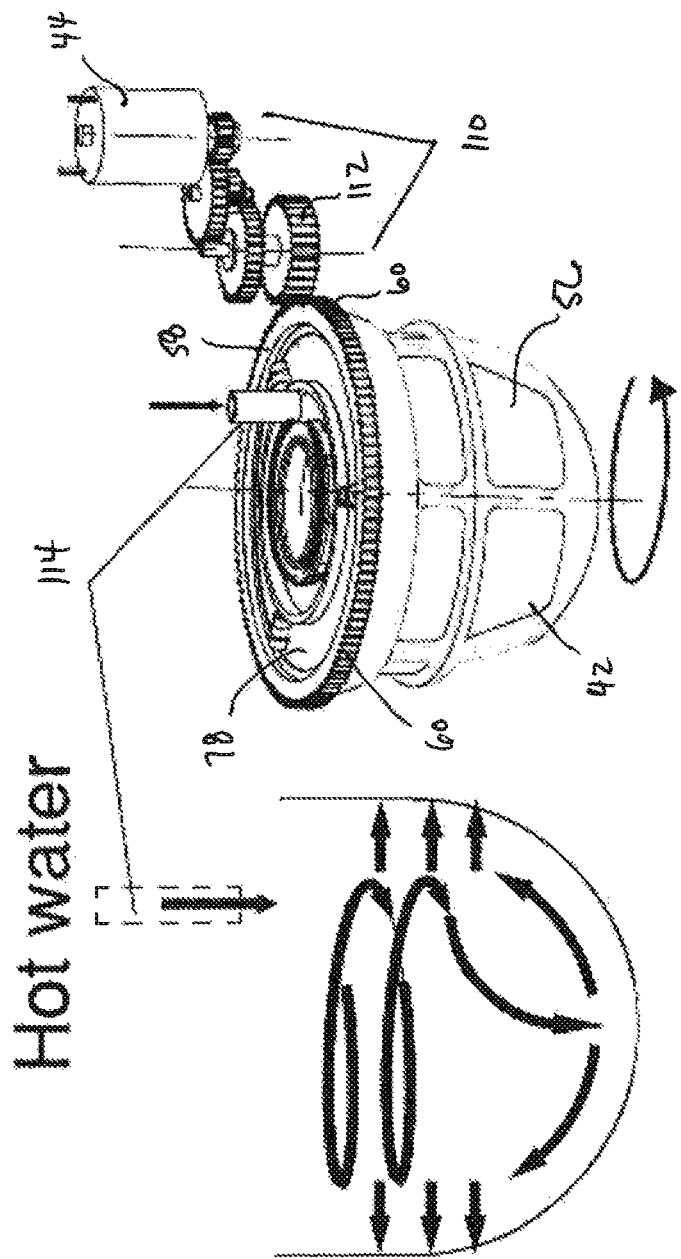

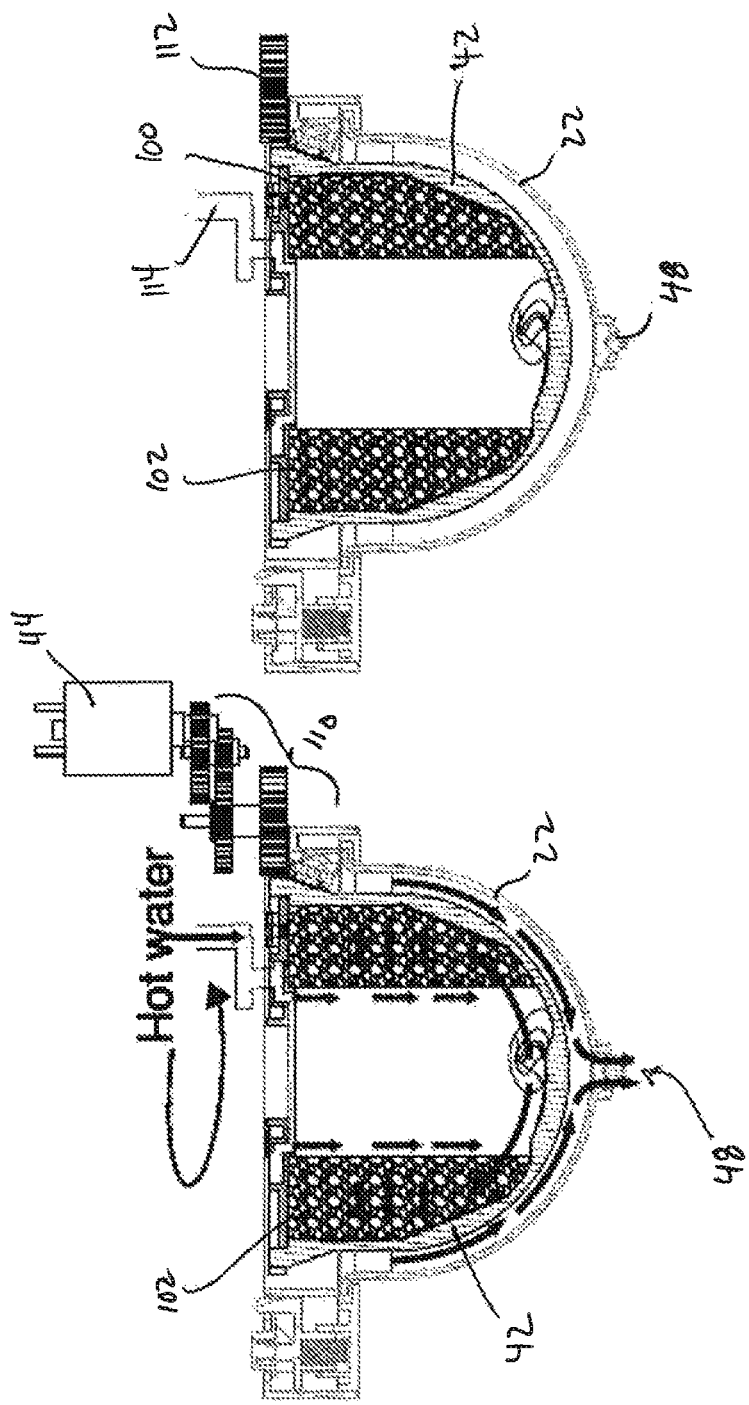

COFFEE MAKING APPLIANCE

CROSS REFERENCE TO RELATED APPLICATION

This is a Continuation-in-Part Application claiming priority to U.S. Utility application Ser. No. 14/984,513, filed Dec. 30, 2015, now U.S. Pat. No. 10,004,354, and hereby incorporated by reference in its entirety.

TECHNICAL FIELD

The present invention relates to brewed beverage appliances and, more particularly, to a coffee making appliance and method for brewing coffee.

BACKGROUND OF THE INVENTION

Various known coffee making appliances involve adding of coffee beans in one of various forms (i.e., ground or unground) to a container that is part of a machine in which heated water is delivered to the container and passes therethrough. The container typically includes a filtering mechanism so that heated water exiting the container is in the form of brewed coffee. Certain appliances require pre-ground coffee beans to be added in the form of "grounds." Other appliances are designed to accept whole coffee beans into a hopper or opening and include mechanisms that grind the beans into a ground form and then complete the brewing process.

While existing appliances are generally suitable for what is regarded as ordinary performance, there is room for improvement in terms of ease of use and the quality of coffee produced by such appliances. In particular, existing appliances that both grind and brew coffee are prone to clogs during the grinding stage and may not produce a consistent extraction during the brewing stage. Moreover, changing over to a different roast or flavor of coffee bean is often tedious and time consuming, as is emptying the filter to ready another brewing cycle.

In view of the above, there is a need for a coffee making appliance that is capable of both grinding and brewing coffee quickly and easily, and which can be easily cleaned for subsequent use.

SUMMARY OF THE INVENTION

It is an object of the present invention to provide a coffee making appliance and related method of brewing coffee.

It is another object of the present invention to provide a coffee making appliance that is capable of both grinding whole coffee beans to produce coffee grounds, and brewing coffee utilizing such grounds.

It is another object of the present invention to provide a coffee making appliance that is less prone to clogs in the grinding stage.

It is another object of the present invention to provide a coffee making appliance that allows for the adjustment of the size of coffee grounds produced during the grinding stage.

It is another object of the present invention to provide a coffee making appliance that yields consistent and even extraction of coffee in the brewing stage.

It is another object of the present invention to provide a coffee making appliance that dries coffee grounds after brewing to facilitate discarding of such grounds.

These and other objects are achieved by the present invention.

According to an embodiment of the present invention, a coffee making appliance includes a housing having a base for supporting a container configured to receive brewed coffee, a reservoir for receiving water to be heated, a hopper configured to receive a quantity of whole coffee beans, the hopper having an outlet, a vertically-oriented burr grinder positioned adjacent to the outlet of said hopper, the grinder being configured to transform the whole coffee beans into coffee grounds, a filter removably received by the housing for receiving the coffee grounds from the grinder, a pump configured to supply water from the reservoir to the filter, and a driving mechanism configured to rotate the filter while the water is supplied to the filter to cause the water to pass radially through the coffee grounds to produce the brewed coffee.

According to another embodiment of the present invention, a coffee making appliance includes a housing having a base for supporting a container configured to receive brewed coffee, a hopper configured to receive a quantity of whole coffee beans, the hopper having an outlet, a grinder positioned adjacent to the outlet of the hopper, the grinder being configured to transform the whole coffee beans into coffee grounds, a filter removably received by the housing for receiving the coffee grounds from the grinder, and a driving mechanism configured to rotate the filter while water is supplied to the filter. The filter is configured to rotate for a period of time after a flow of water to the filter is ceased to dry the coffee grounds within the filter.

According to yet another embodiment of the present invention, a method for brewing coffee includes the steps of, with a vertical burr grinder, grinding a plurality of whole coffee beans to produce coffee grounds, transferring the coffee grounds to a filter, rotating the filter to distribute the coffee grounds along a sidewall of the filter, passing heated water into the filter and radially through the coffee grounds to produce brewed coffee, and ceasing a flow of the heated water into the filter while maintaining rotation of the filter for a predetermined period of time to expel moisture from the coffee grounds.

BRIEF DESCRIPTION OF THE DRAWINGS

FIG. 5 is a bottom perspective view of a filter of the coffee making appliance, according to an embodiment of the present invention.

FIG. 6 is a top perspective view of the filter of FIG. 5.

FIG. 13 is a perspective view illustrating the insertion of the filter into a filter holder of the coffee making appliance, according to an embodiment of the present invention.

FIG. 16 is a front perspective view of the coffee making appliance of FIG. 1, illustrating the internal components thereof.

FIG. 17 is a rear perspective view of the coffee making appliance of FIG. 1, illustrating the internal components thereof.

FIG. 23 is a perspective and schematic illustration of a coffee chute of the coffee making appliance, showing the chute in an open position.

FIG. 24 is a perspective and schematic illustration of a coffee chute of the coffee making appliance, showing the chute in a closed position.

FIG. 25 is a schematic illustration of a hopper and grinder of the coffee making appliance, illustrating a grinding operation thereof.

FIGS. 28-37 illustrate a centrifugal brewing operation of the coffee making appliance of FIG. 1.

FIG. 40 illustrates the path of grounds in the assembly shown in FIG. 39.

DETAILED DESCRIPTION OF THE PREFERRED EMBODIMENTS

Figure 1:
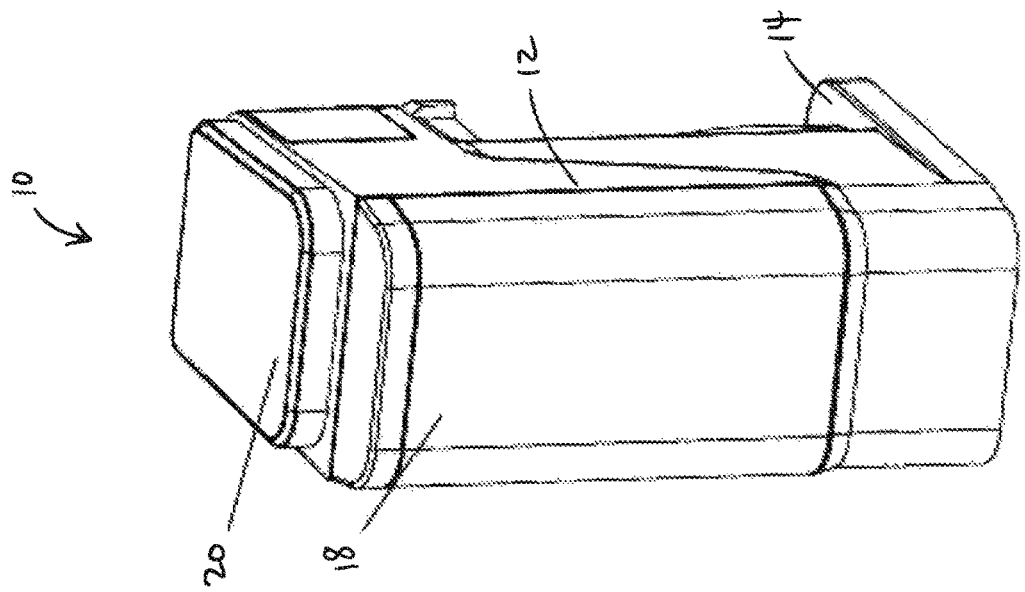
FIG. 1 is a front perspective view of a coffee making appliance according to an embodiment of the present invention.
Figure 2:
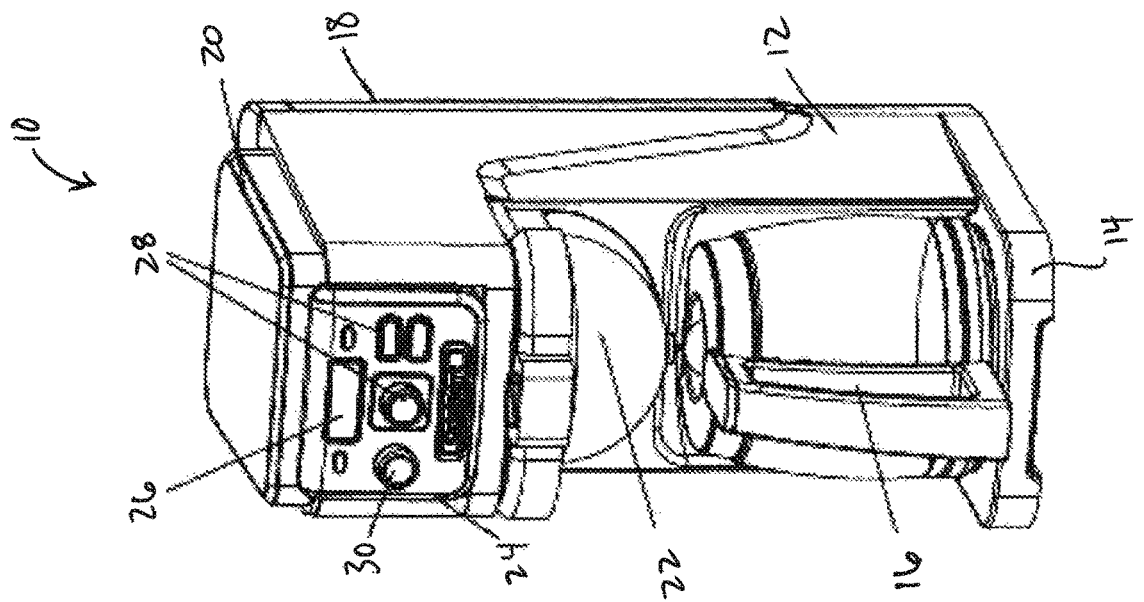
FIG. 2 is a rear perspective view of the coffee making appliance of FIG. 1.
Figure 3:
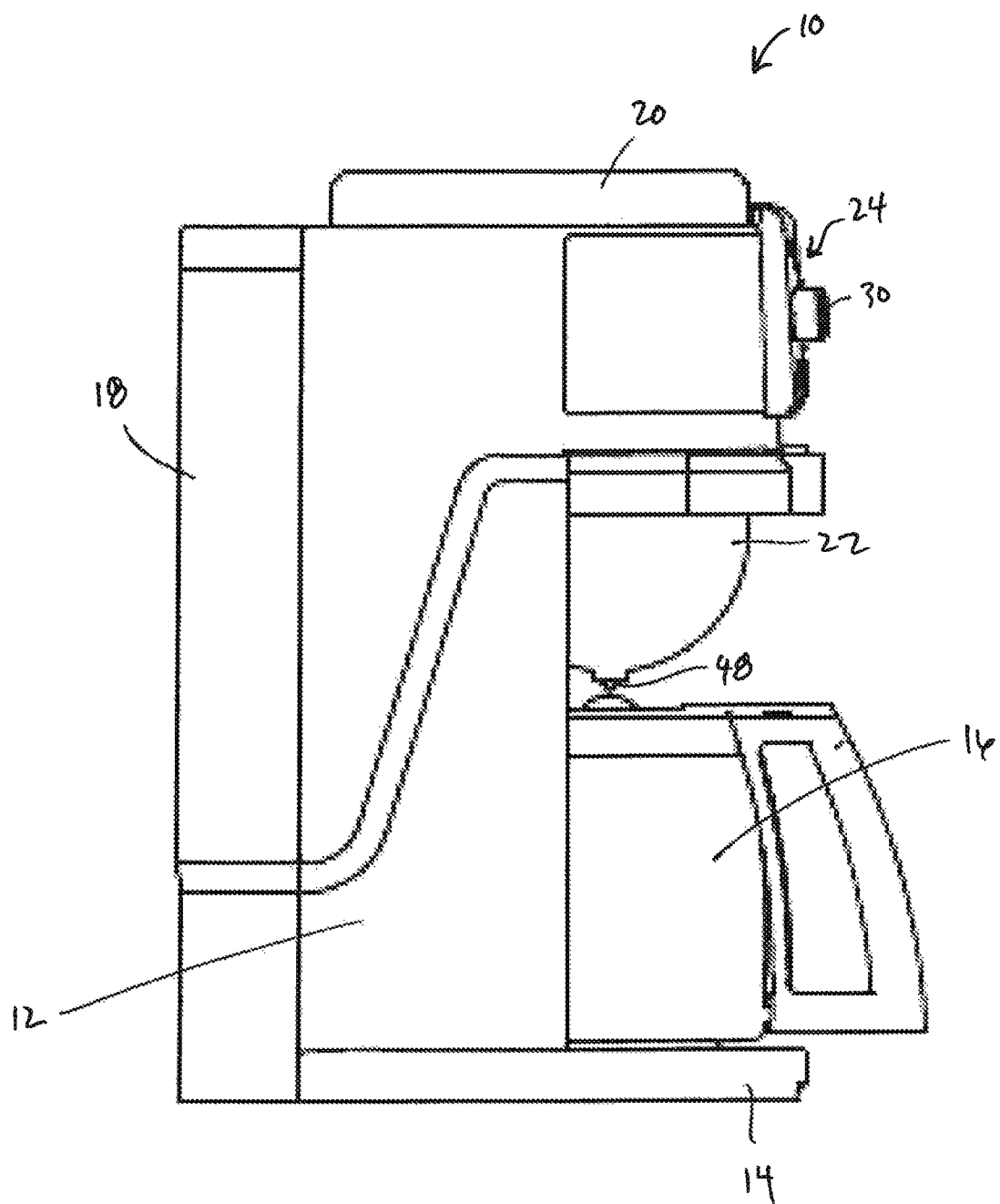
FIG. 3 is a left side elevational view of the coffee making appliance of FIG. 1.

Referring to FIGS. 1-3, a coffee making appliance according to an embodiment of the present invention is illustrated. As shown therein, the appliance 10 includes a generally rectangular housing 12 having a base 14 configured to receive a carafe 16. The base 14 may include a drip tray 15 having a slotted surface for collecting spilled coffee, as is known in the art. A water reservoir 18 is removably receivable by the housing 12 and is configured to supply water for brewing coffee, as discussed in detail hereinafter. An upper portion of the housing 12 defines a hopper 20 configured to receive coffee beans for grinding into coffee grounds. A partially spherical or ball-shaped filter holder 22 is slidably receivable by the housing 12 above the carafe 16 and below the hopper 20. In an embodiment, the filter holder 22 is transparent. A front of the appliance 10 includes a user interface and control unit 24 providing for user control of the appliance. The user interface and control unit 24 may include a LCD display 26, function selector buttons 28, and a rotatable knob 30 that enable a user to control grinding and brewing operations, as discussed in detail hereinafter.

Figure 4:
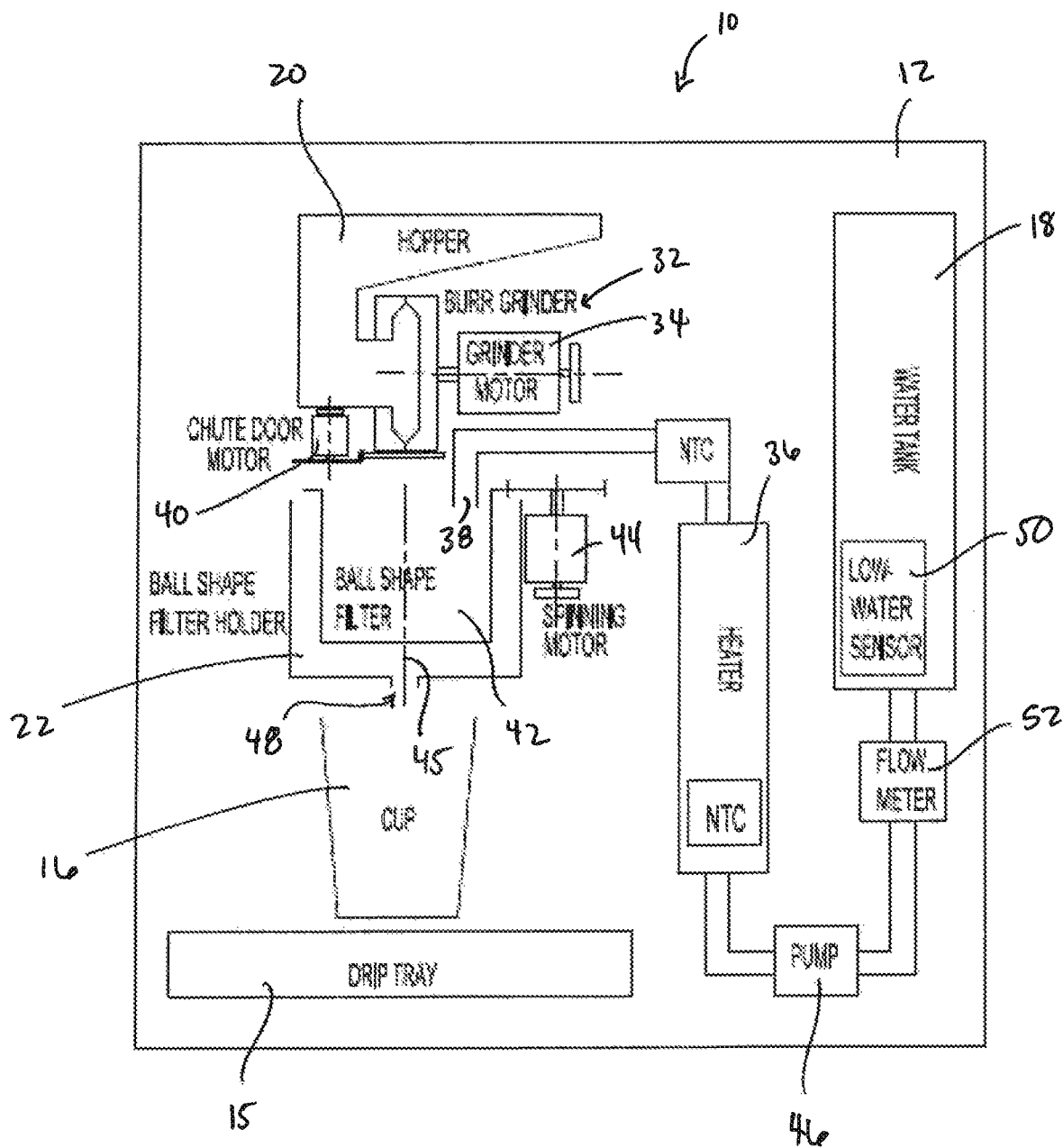
FIG. 4 is a schematic illustration of the internal components of the coffee making appliance of FIG. 1.
Figure 7:
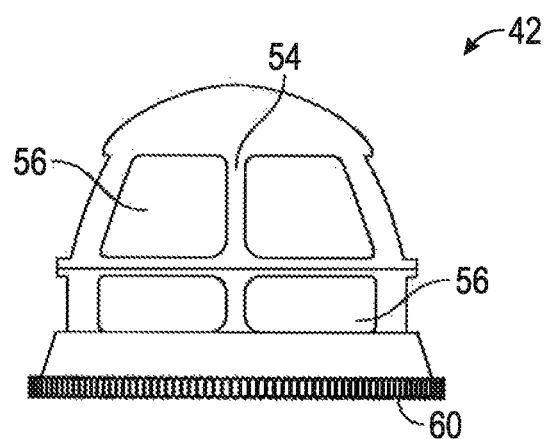
FIG. 7 is a side elevational view of the filter of FIG. 5.
Figure 8:
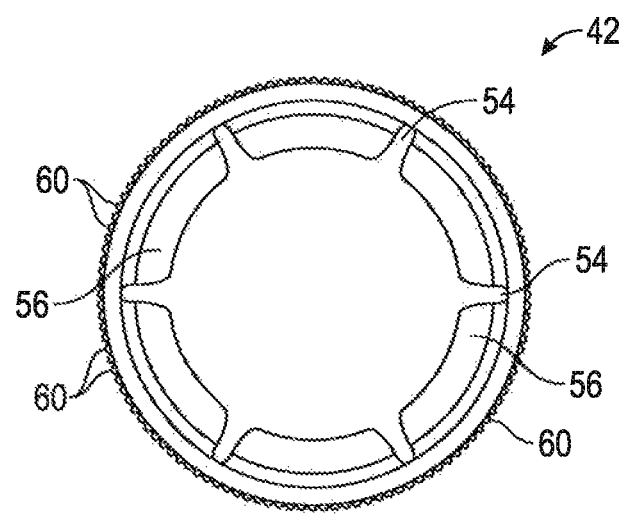
FIG. 8 is a bottom plan view of the filter of FIG. 5.
Figure 9:
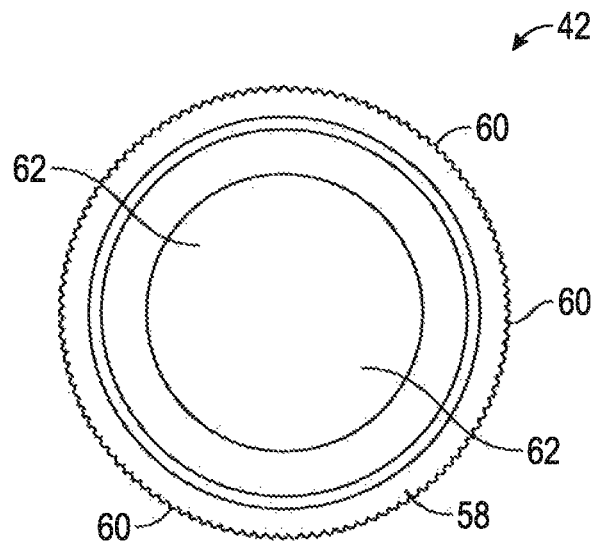
FIG. 9 is a top plan view of the filter of FIG. 5.

Turning now to FIG. 4, a schematic illustration of the coffee making appliance 10 is shown. As shown therein, the housing 12 encloses a burr grinder 32 associated with an outlet of the hopper 20. Burr grinder 32 is driven by a grinder motor 34. A line heater 36 is located between the water reservoir 18 and a water outlet 38 positioned above the filter holder 22 and is configured to heat the water received from the reservoir 18. In operation, whole coffee beans loaded into the hopper 20 are ground by the burr grinder 32. The ground coffee passes through a chute (having a chute door driven by a chute door motor 40) and into a ball-shaped filter 42 received by the filter holder 22. A motor 44 is engageable with the filter 42 and functions to spin the filter 42 about a vertical axis 45. As the filter 42 with ground coffee rotates, water from the water tank is pumped by pump 46 through the heater 36, where it is heated, and into the filter 42 from above. The heated water passes through the coffee grounds, producing brewed coffee, and into the carafe 16 or a user's cup through an outlet 48 in the filter holder 22. In an embodiment, the water tank may include a sensor 50 for indicating when the water level within the tank 18 is low. A flow meter 52 may also be provided to indicate the amount of water injected into the filter 42, as is known in the art. Sensed parameters may be communicated to the control unit 24 for display to a user and/or for use in controlling the grinding and brewing operations.

Referring now to FIGS. 5-9, various views of the filter 42 are shown. The filter 42 is generally spherical or ball-shaped and includes a plurality of structural ribs 54 that support a filtering material 56. The filter 42 includes a top rim 58 defining an open top and having a plurality of circumferential teeth 60 disposed on an outward facing surface of the rim 58. The bottom surface of the filter 42 is devoid of any opening or filtering material, which prevents any water from exiting through the bottom of the filter. As best illustrated in FIG. 6, the interior bottom surface of the filter 42 is formed with a plurality of ribs 62 that facilitate centrifugal brewing, as discussed hereinafter.

Figure 12:
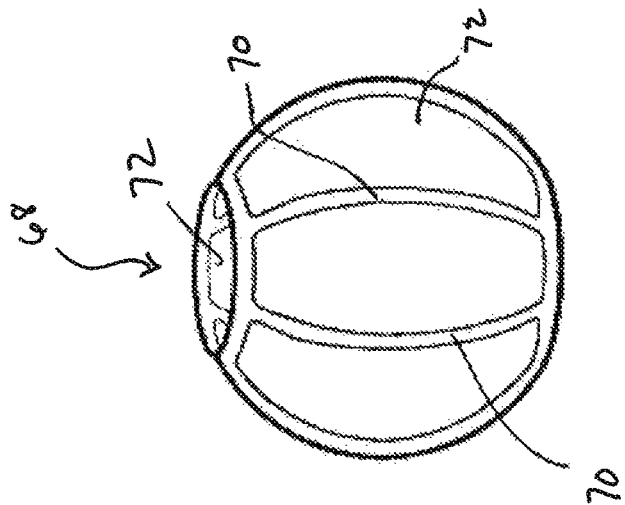
FIG. 12 is a perspective view of a filter of the coffee making appliance, according to another embodiment of the present invention.
Figure 11:
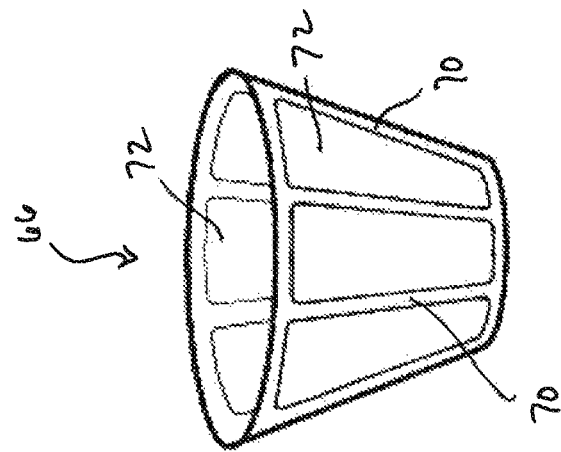
FIG. 11 is a perspective view of a filter of the coffee making appliance, according to another embodiment of the present invention.
Figure 10:
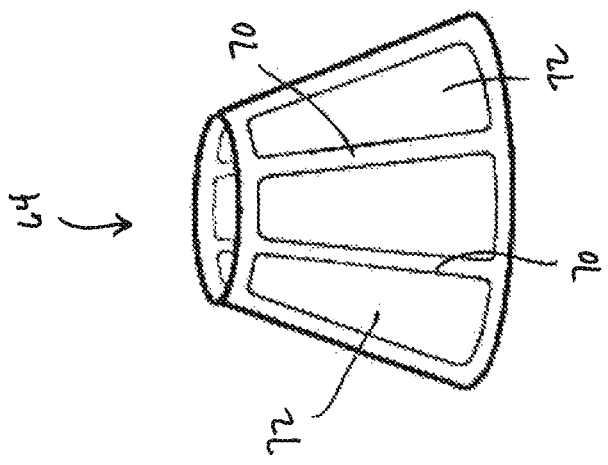
FIG. 10 is a perspective view of a filter of the coffee making appliance, according to another embodiment of the present invention.

FIGS. 10-12 illustrate various alternative filter designs. For example, FIG. 10 illustrates a cone-shaped filter 64, FIG. 11 illustrates an inverted cone-shaped filter 66 and FIG. 12 illustrates a ball-shaped filter 68, all of which are of generally similar construction to filter 42 and include a plurality of structural ribs 70 with filtering material 72 therebetween.

Figure 14:
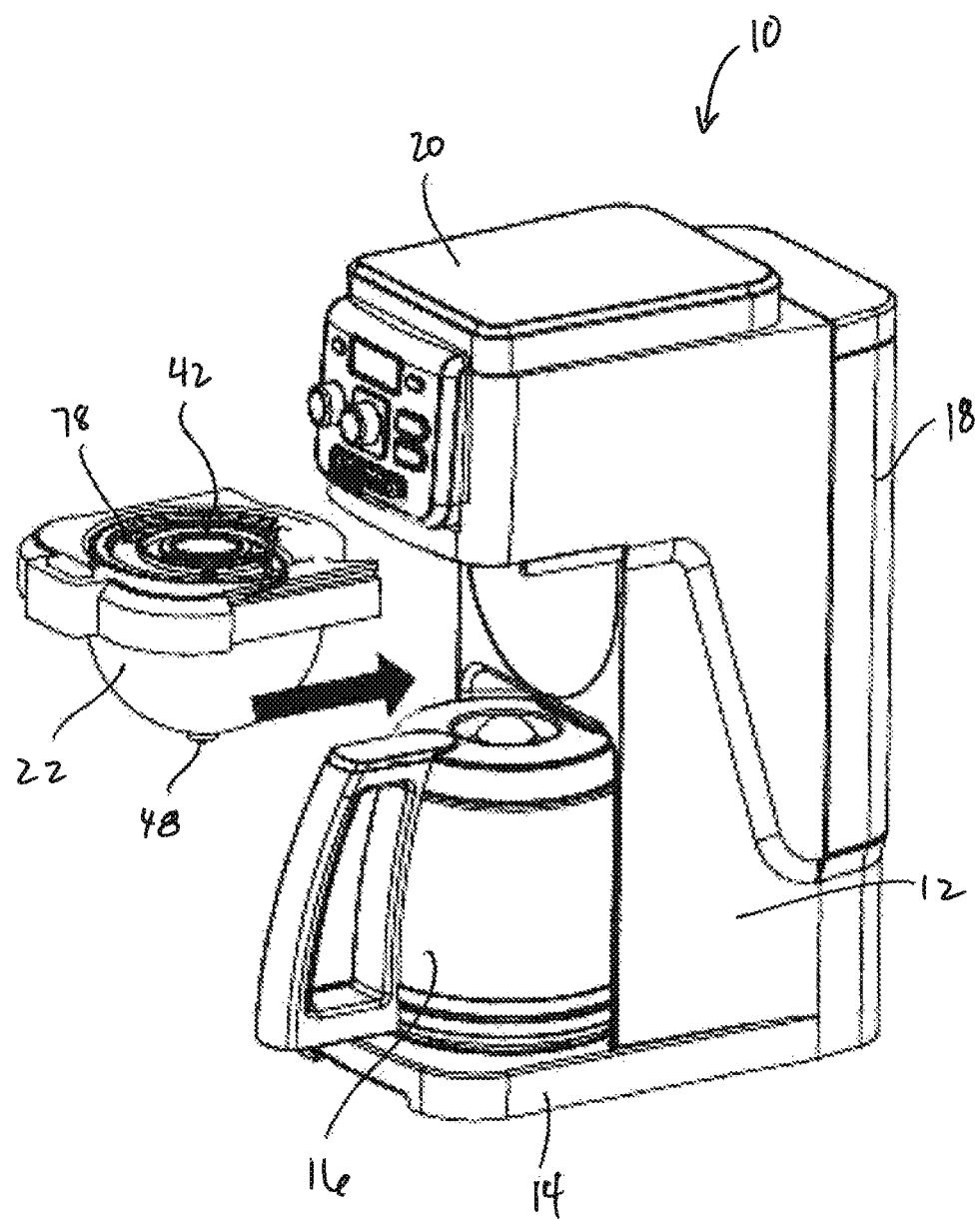
FIG. 14 is a perspective view illustrating insertion of the filter and filter holder into the coffee making appliance of FIG. 1.
Figure 15:
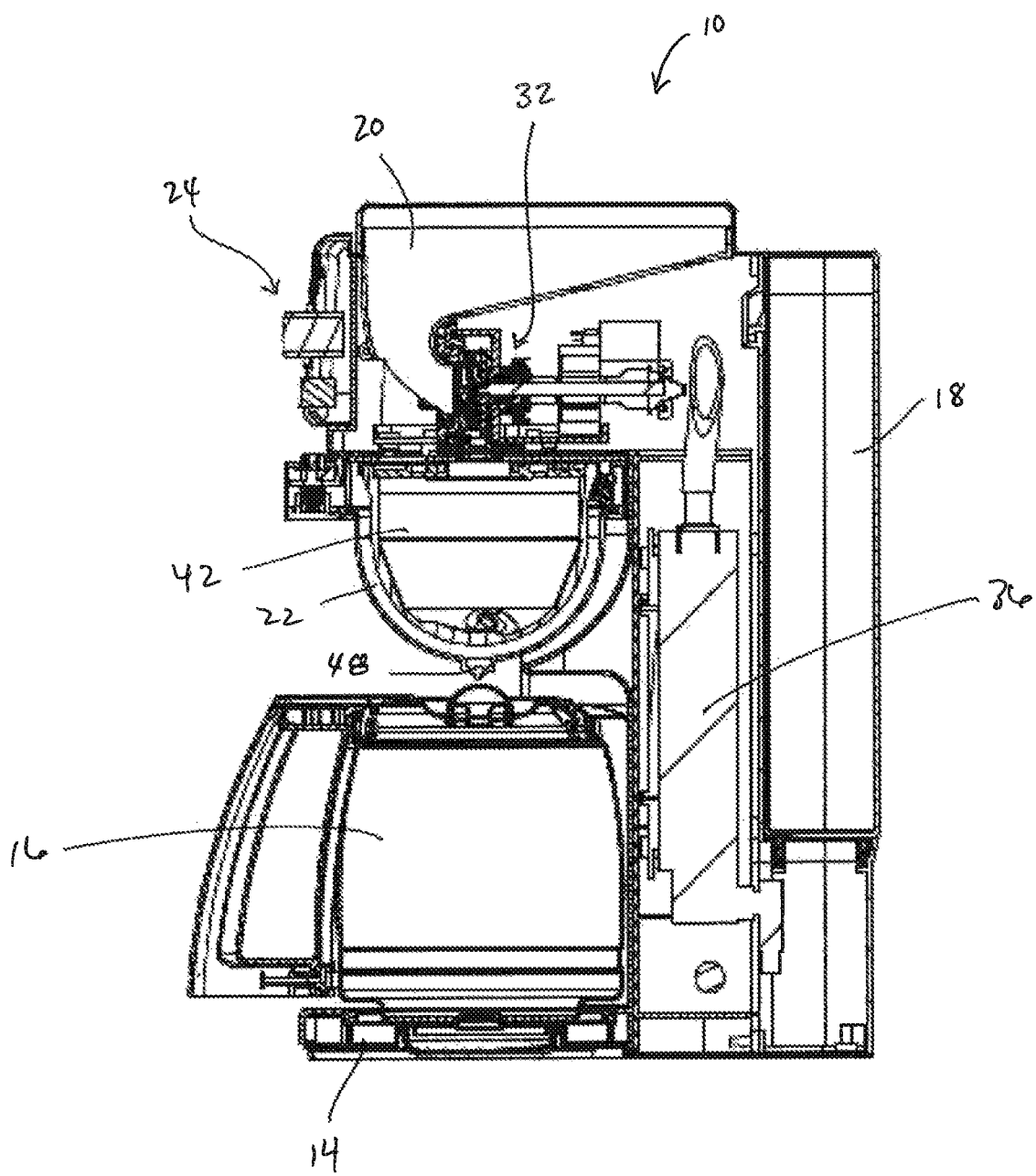
FIG. 15 is a side cross-sectional view of the coffee making appliance of FIG. 1.
Figure 18:
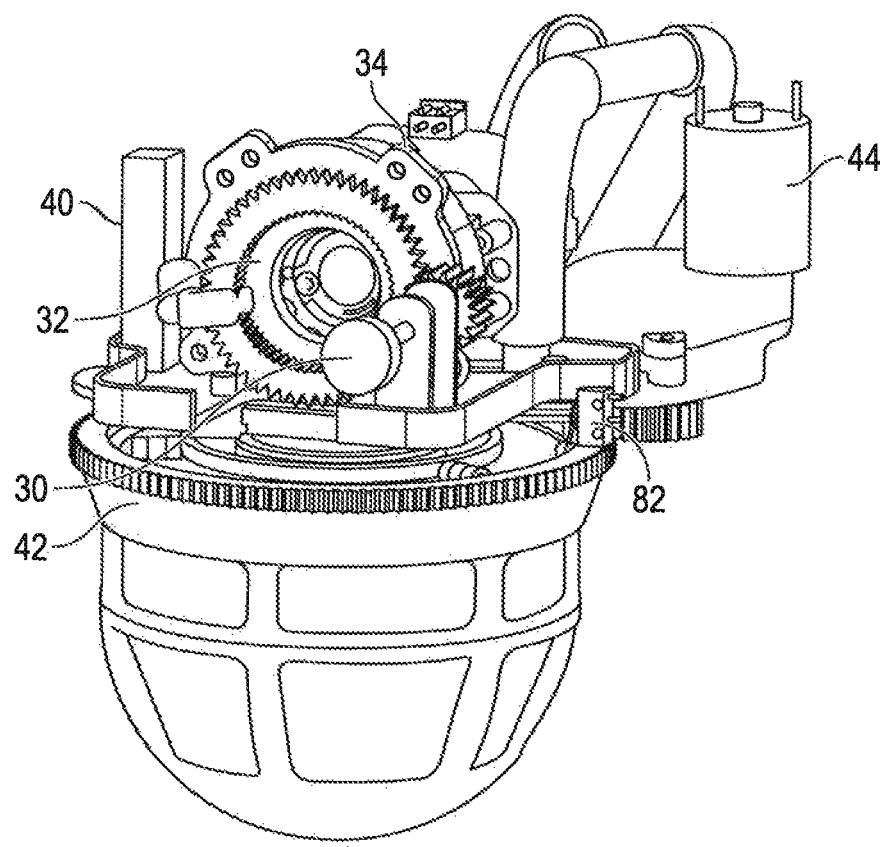
FIG. 18 is an enlarged, perspective view of a grinder and filter of the coffee making appliance of FIG. 1.

Referring now to FIG. 13, insertion of the filter 42 into the filter holder 22 is illustrated. As shown therein, the filter holder 22 defines a generally rectangular frame having a circular opening 74 therein. An inner facing surface that defines the opening includes a plurality of roller supports 76 projecting inwardly therefrom. In use, a user first places a filter lid 78 atop the filter 42. Importantly, the filter lid 78 has a central opening 80 that permits coffee grounds from the grinder 32 to pass there through and into the filter 42. The filter 42 with lid 78 in place is then inserted into the circular opening 74 in the filter holder 22 in the direction of arrow A. The roller supports 76 engage an outer surface of the filter 42 just below the top rim 58 and facilitate rotation of the filter 42 within the frame of the filter holder 22, as discussed in detail below. The filter holder 22, with filter 42 therein, may then be inserted into the coffee appliance 10, as illustrated in FIG. 14.

FIGS. 15-18 illustrate the major internal components of the coffee making appliance 10 including the grinder motor 34 that drives the blades of the grinder 32, the pump 46 that draws water from the reservoir 18 during brewing, the heater 36 that heats water pumped from the reservoir 18 for subsequent passage through the coffee grounds, the adjustable knob 30 that is utilized to control the grind size of the coffee, the spinning motor 44 that serves to rotate the filter 22, first and second position switches 82, 83 configured to sense and control the opening and closing of the chute door to allow ground coffee to pass into the filter 42, and the chute door motor 40 that opens and closes the chute door.

Figure 19:
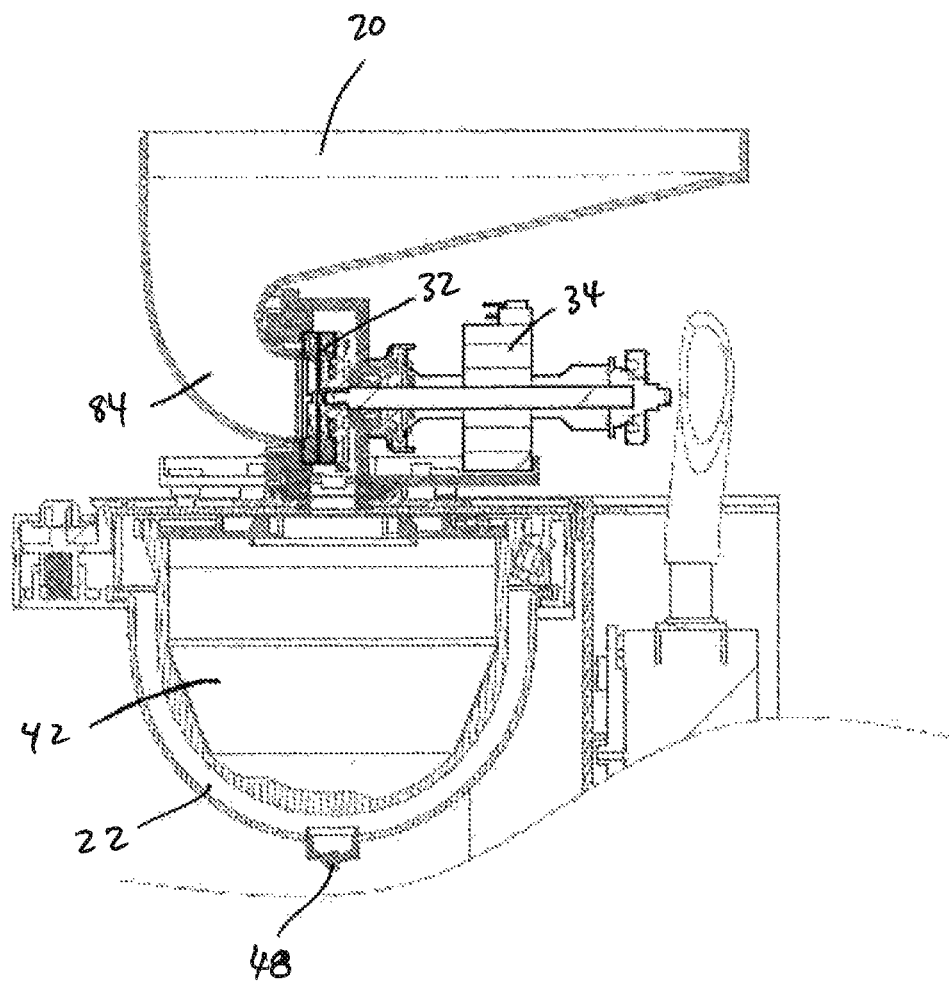
FIG. 19 is a cross-sectional view of the grinder and filter of the coffee making appliance of FIG. 1.

With specific reference to FIG. 19-25, the grinding assembly of the coffee making appliance is best illustrated. As best shown in FIG. 19, the hopper 20 includes an enlarged top portion for accepting a quantity of whole coffee beans and a curved lower conduit 84 configured to direct the whole coffee beans to a vertically-oriented burr grinder 32 at the mouth of the conduit 84. The curvature of the conduit 84 serves to smoothly feed the coffee beans into the burr grinder 32. The vertical burr grinder 32 is driven by motor 34 that is horizontally arranged. This orientation (i.e., the horizontally oriented motor 34 and the vertically oriented burr grinder 32), together with the curved coffee bean conduit 84, allows for both high speed grinding (on the order of about 15,000 rpm to about 25,000 rpm) and low speed grinding (on the order of about 500 rpm to about 3,000 rpm).

Figure 20:
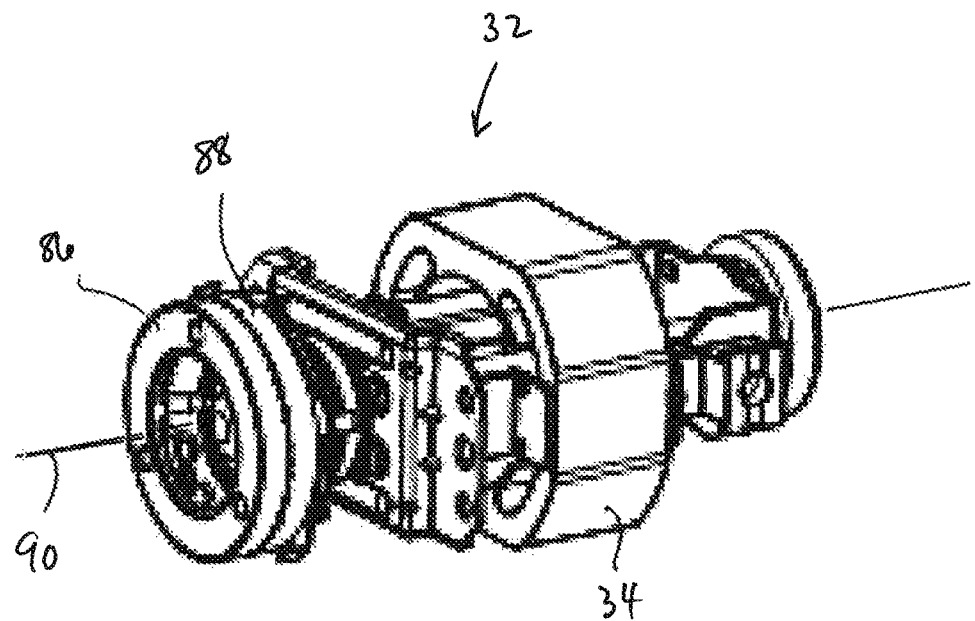
FIG. 20 is a perspective view of the grinder.
Figure 21:
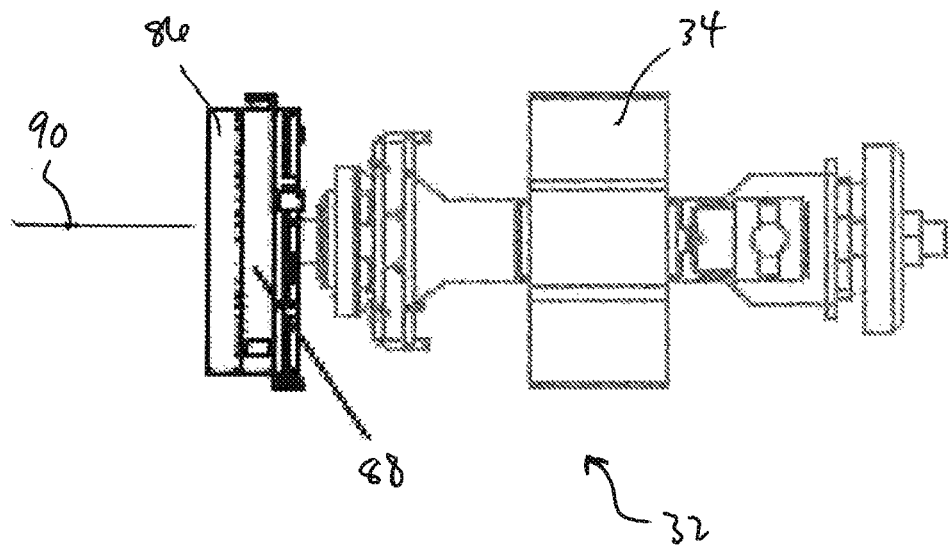
FIG. 21 is a side elevational view of the grinder.

FIGS. 20 and 21 illustrate the vertical arrangement of the burr grinder 32. As shown therein, the burrs 86, 88 of the grinder 32 rotate about a horizontal axis 90 to grind whole coffee beans, in a manner heretofore known in the art. Indeed, aside from the vertical orientation of the burrs 86, 88 and the horizontal orientation of the motor (having a horizontal driving shaft for rotating the burrs 86, 88) the burr grinder 32 is configured to operate in a manner generally known in the art in order to transform whole coffee beans into coffee grounds for use in a subsequent brewing process. In the preferred embodiment, knob 30 on the face of the appliance 10 is rotatable to adjust the gap distance between the two burrs 86, 88 of the grinder 32 to control grind size of the coffee.

Figure 22:
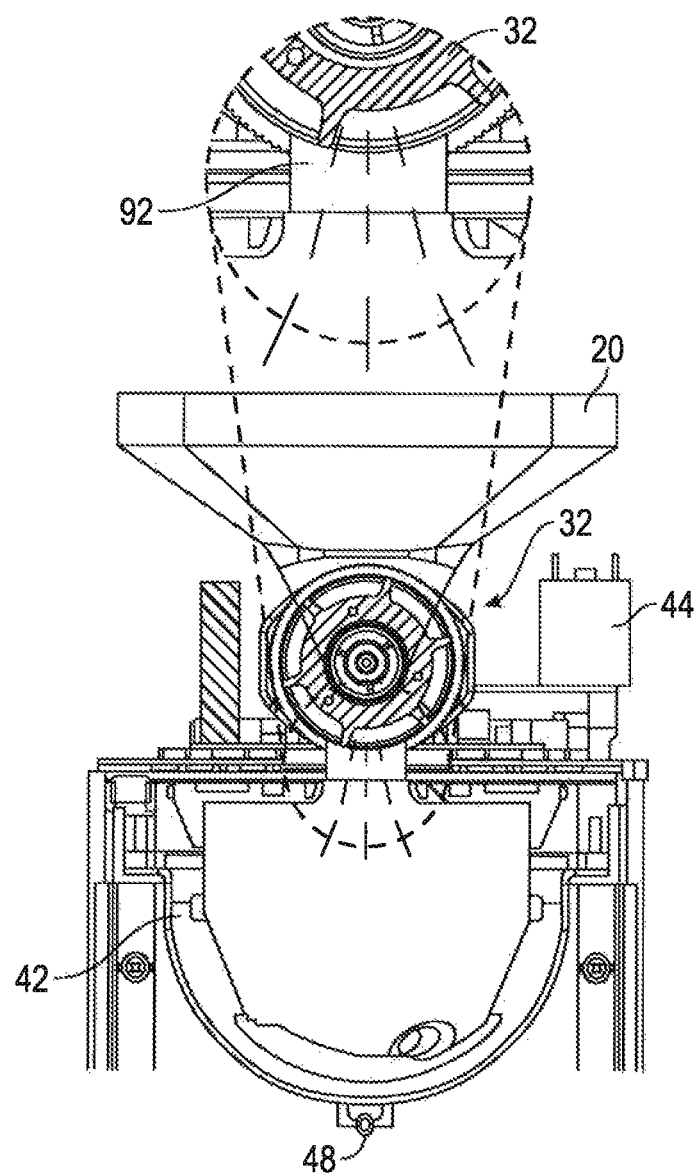
FIG. 22 is a schematic illustration of a grinding operation of the coffee making appliance.

With reference to FIG. 22, the appliance 10 includes a chute 92 for selectively directing coffee grounds from the grinder 32 into the filter 42 after they have been ground. Importantly, the chute 92 is aligned with the opening 80 in the lid 78 of the filter 42 so that the grounds may pass through the lid 78 under the force of gravity. The length of the chute 92 is preferably minimized to reduce the likelihood of clogging within the chute 92. In connection with the above, and with reference to FIGS. 23 and 24, the coffee making appliance 10 includes a chute door 94 positioned directly below the chute 92, and that is controllable to selectively close off the chute 92. In particular, the chute door 94 is operably connected to an eccentric wheel 96 that is rotatably driven by the chute door motor 40. When the chute door motor 40 rotates, the eccentric wheel 96 moves the chute door 94 linearly, from the open position illustrated in FIG. 23 to the closed position illustrated in FIG. 24.

In the open position, an opening 98 in the chute door 94 is aligned with the chute 92, allowing coffee grounds to pass therethrough and into the filter 42 (see lower portion of FIG. 23). In the closed position, the opening 98 is not aligned with the chute 92, thereby preventing coffee grounds from pass through to the filter 42 (see lower portion of FIG. 24). Importantly, the sliding of the door 94 between the opened and closed positions triggers the position switches 82, 83 arranged on opposing sides of the door 94. Triggering of either of the switches 82, 83 by the door 94 causes the chute door motor 40 to stop, until a subsequent open or close command is received. In particular, the switches 82, 83 are electrically connected to the motor 40 such that activation either of the switches 82, 83 causes the motor 40 to stop, ceasing further movement of the door.

Referring to FIG. 25, a grinding operation of the coffee making appliance 10 is illustrated. As shown therein, a quantity of whole coffee beans 100 are first loaded into the hopper 20. A user may then initiate a grinding/brewing cycle through the control panel 24. Actuation of the cycle initiates the chute door motor 40, which causes the chute door 94 to slide from its closed position to its open position where the opening 98 is aligned with the chute 92. The motor 40 continues to operate to laterally move the chute door 94 until the chute door contacts the first position switch 82, which triggers the motor 40 to deactivate. At the same time, the grinder motor 34 is also initiated in order to commence grinding of the whole beans. The coffee beans 100 are ground by the vertical burr grinder 32 to produce coffee grounds 102, which fall directly downward through chute 92, through the opening 98 in the chute door 94, through the opening 80 in the lid 78 of the filter 42, and into the filter 42. After a predetermined time period, or after a predetermined quantity of grounds enter the filter 42, the grinder motor 34 may be deactivated and the chute door motor 40 is activated in order to move the chute door 94 to its closed position. In the closed position, the door 94 contacts the second position switch 83, triggering the chute door motor 40 to deactivate. Importantly, closing of the chute door 94 after filling the filter 42 with coffee grounds 102 seals the grinding unit and hopper compartment from potential back flow of steam and moisture during the brewing process.

As will be readily appreciated, the quantity of coffee grounds loaded into the filter 42 may be controlled by the control unit 24 automatically after a user selection of a volume of coffee desired (e.g. an entire carafe, single serving, etc.).

Figure 27:
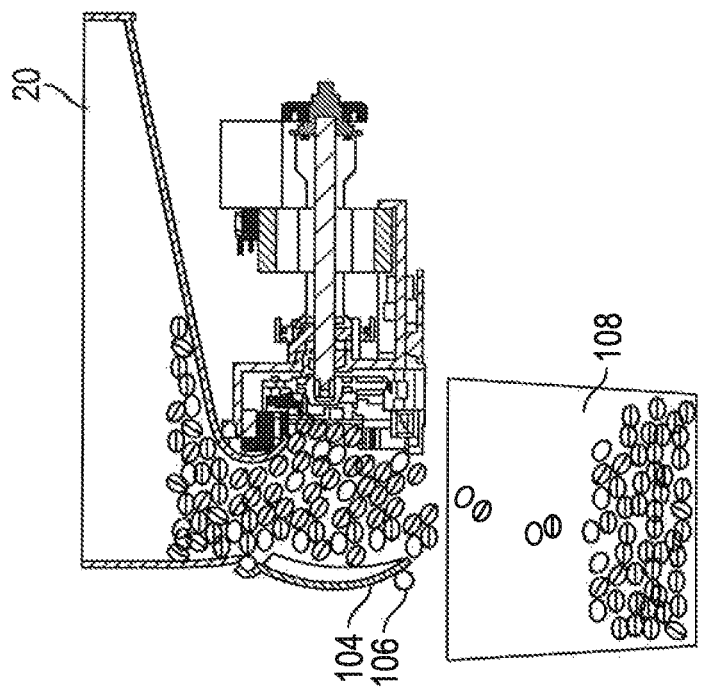
FIGS. 26 and 27 are simplified, side elevational views of a hopper of the coffee making appliance of FIG. 1, illustrating a coffee bean outlet.
Figure 26:
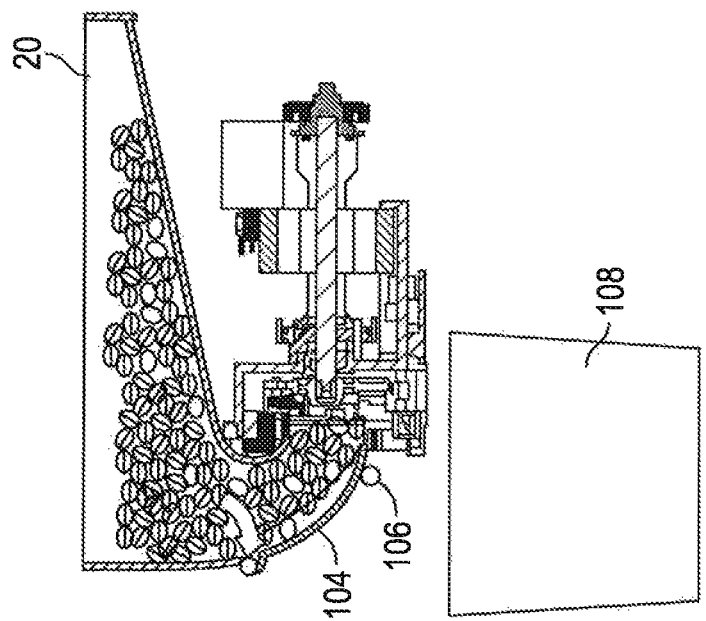

As illustrated in FIGS. 26 and 27, the hopper 20 additionally includes a hinged door 104 in the area of the curved portion of the conduit 84 that may be opened in order to drain the hopper 20 of whole, unground beans. In an embodiment, the door 104 may include a trigger 106 depressible by a user to open the door 104 to drain the remaining coffee beans into a container 108. This feature allows a user to quickly and easily change the flavor or roast of coffee beans utilized in the appliance 10 without having to grind all of the beans or to manually scoop the beans from the hopper.

Turning to FIGS. 28-37, a centrifugal brewing assembly of the coffee making appliance 10 will now be described. As best shown in FIGS. 29 and 33 an output of the spinning motor 44 is operatively connected to the filter 42 through an array of gears 110. In operation, the rotating output of the spinning motor 44 causes a corresponding rotation of the gears of the gear assembly 110, including rotation of connection gear 112 which includes a plurality of teeth that are intermeshed with the teeth 60 on the rim 58 of the filter 42. Accordingly, rotation of the connection gear 112 by the motor 44 causes a corresponding rotation of the filter 42 within the frame of the filter holder 22. Support of the filter 42 by the rotating guides 76 of the filter holder 22 further facilitates free rotation of the filter 42.

In operation, once the filter 42 is filled with coffee grounds 102 in the manner discussed above, the brewing cycle commences. First, water is pumped from the reservoir 18 by pump 46, through heater 36 where it is heated to a desired temperature, and into the filter 42 through a hot water inlet 114 positioned above the filter 42, in a manner generally known in the art, in order to pre-wet the coffee grounds 102. This pre-wetting step is best illustrated in FIGS. 30 and 31. After a predetermined period of time, under control of the control unit 24, the spinning motor 44 is automatically activated to rotate the filter 42 within the filter holder 22.

Importantly, the position of water inlet 114 is fixed relative to the rotating filter 42, as best illustrated in FIGS. 32 and 33. Because of this, water flows into the filter 42 in a spiral pattern, which helps to distribute the water more evenly among the coffee grounds 102. As a result, more consistent and uniform coffee extraction may be realized.

As best shown in FIG. 34, as water is passed into the rotating filter 42, centrifugal force is generated. Accelerated by the centrifugal force, the hot water is squeezed through the coffee grounds 102 in a radial direction in order to produce brewed coffee. In particular, the centrifugal force generated by rotation of the filter 42 causes the coffee grounds 102 and hot water to be forced radially outward. The hot water passes through the grounds 102 and exits the filter 42 through the filtering material 56. This brewed coffee then drains along the sides of the filter holder 22 and out of the outlet 48 in the bottom thereof, as illustrated by the arrows. At the end of the brewing cycle, the control unit 24 stops the flow of hot water.

Figure 37:
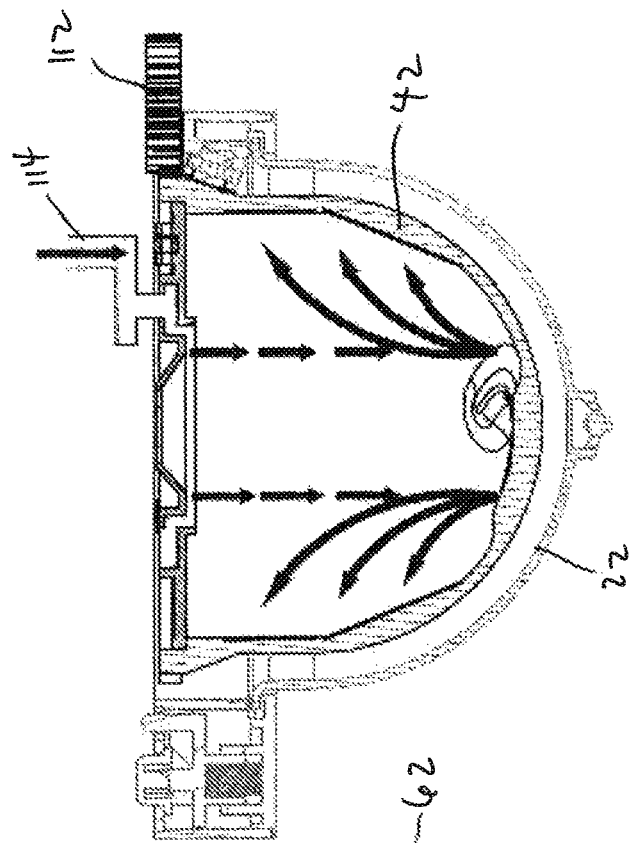
Figure 36:
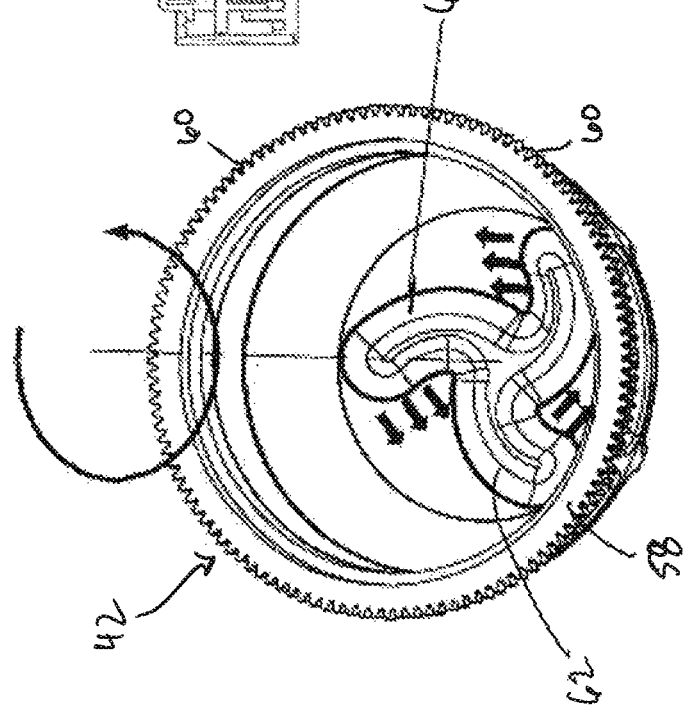

With reference to FIGS. 36 and 37, the ribs 62 located on the interior, bottom floor of the filter 42 serve to spray or splash the hot water that reaches the bottom of the filter 42 upwardly during the brewing cycle. This assists in providing a more uniform contact of the water with the coffee grounds 102, especially with the grounds towards the top of the filter 42 (see, e.g., the spray of water represented by the arrows in FIG. 37), and prevents water from concentrating at the bottom of the filter 42. In addition, the ribs 62 aid in centrifugal brewing, to direct the water radial outward towards the sides of the filter 42. This feature has been discovered to yield a more even coffee extraction at all points within the filter 42.

Figure 38:
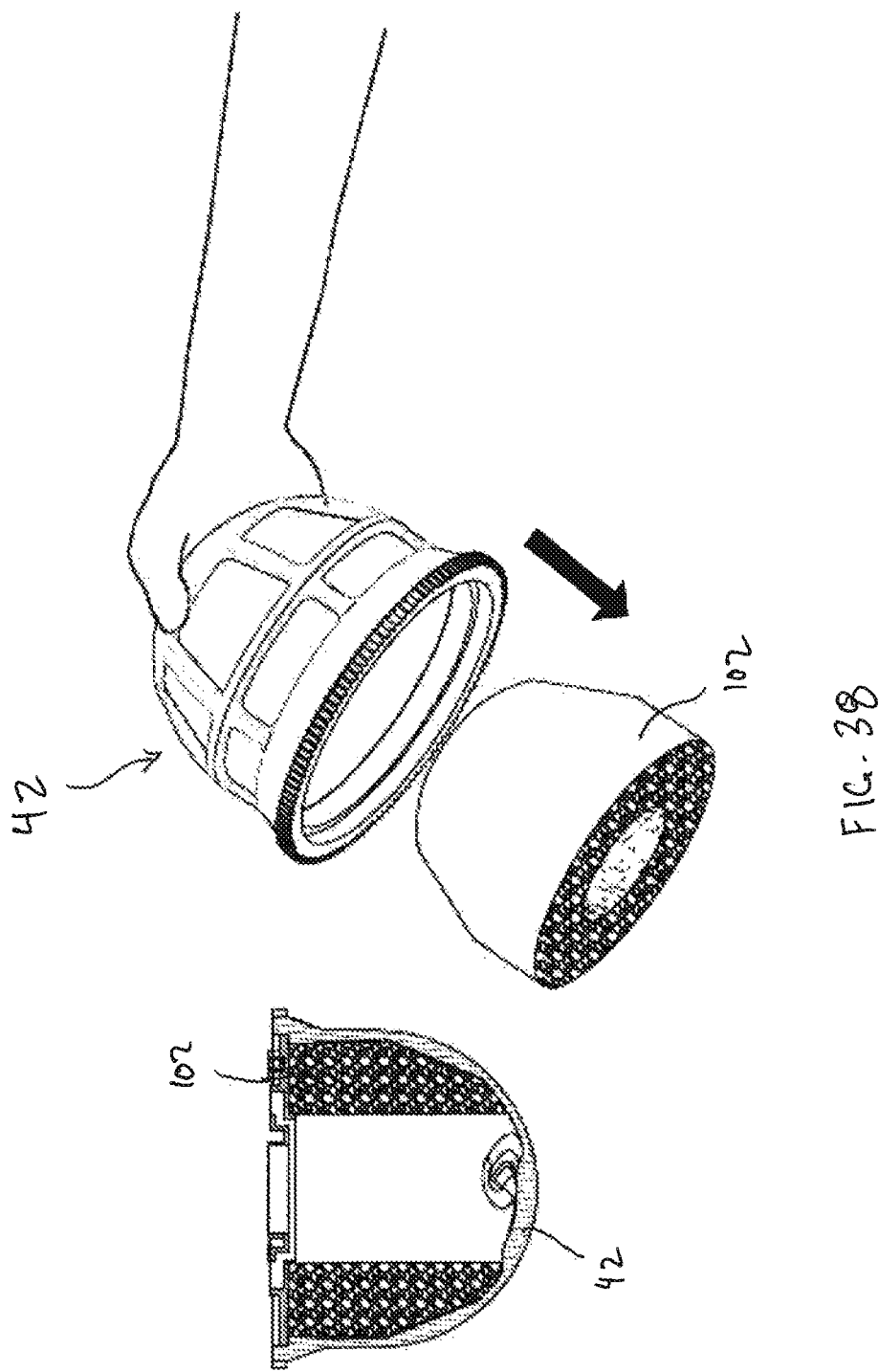
FIG. 38 illustrates the discarding of used coffee grounds.

In an embodiment, the control unit 24 is configured to maintain operation of the spinning motor 44 for a predetermined duration in order to further rotate the filter 42 for a period of time after the flow of hot water is ceased. This additional spinning of the filter 42 after the flow of water is ceased functions to force a substantial majority of liquid from the filter 42, which helps to dry the grounds 102, as shown in FIG. 35. The dried grounds, molded into the shape of a puck or ring, may then be easily discarded by a user as illustrated in FIG. 38. As will be readily appreciated, this facilitates cleaning of the filter 42 so that it may be reused.

In the preferred embodiment, the filter is rotated between approximately 100 rpm and 400 rpm to extract coffee during the brewing cycle. During the drying cycle, the filter is preferably rotated between approximately 500 rpm and 1000 rpm.

In an embodiment, the control unit 24 may be preprogrammed or, alternatively, programmed by a user, to execute a particular rotation pattern, rotation speed and brew time in order to control the flavor and intensiveness of the resulting coffee. For example, the function selector buttons 28 allow for selection of brew size, coffee strength, grinder on/off, timer, etc. As will be readily appreciated, therefore, a user may brew an entire carafe of coffee or a single serving of coffee by selecting the desired amount on the user interface.

In view of the above, the coffee making appliance 10 of the present invention includes three stages of operation, a coffee grinding stage, a centrifugal brewing stage, and a coffee grounds drying stage. During the grinding stage, the chute door is opened by the chute door motor, and the grinder motor rotates to grind the coffee beans. The ground coffee passes through the coffee chute and into the ball-shaped filter. During the brewing stage, the heater is preheated, then water is pumped into the filter at a predetermined temperature under control of the control unit. The filter is rotated by the spinning motor during brewing such that coffee is brewed by centrifugal force and drips out of the filter holder into a carafe or cup placed on the base. During the drying stage, subsequent to brewing, the heater and pump are stopped. The filter, however, keeps spinning to repel any remaining coffee from the filter. The spinning motor is then deactivated once the ground coffee within the filter is dried.

Importantly, the appliance 10 of the present invention facilitates coffee extraction and the flow rate of brewed coffee by utilizing centrifugal force generated by spinning of the filter. In particular, spinning of the filter, in combination with the ribs on the bottom of the filter, results in a more dynamic water flow, which results in more uniform coffee extraction, as well as shortened brewing time as compared with traditional methods. In addition, by spinning the filter at a high speed, for example, in excess of 1,000 rpm, during a short portion of the brewing cycle, a crema-like foam may be created on the top of the brewed coffee. In an embodiment, the coffee extraction level may be adjusted by altering the rotational speed of the filter. This provides a user with an increased level of control of the flavor of the coffee as compared to existing appliances. In other embodiments, a finer filtering material may be utilized to provide finer filtration of coffee, thereby resulting in a smoother tasting beverage.

While the preferred embodiment contemplates the grinding and brewing of coffee from whole coffee beans, the present invention is not intended to be limited in this regard. In particular, it is contemplated that the present invention apparatus and method are not limited to coffee, per se, and the invention may be used to grind and brew tea leaves or other drink mix ingredients.

While FIGS. 28-37 have described a centrifugal brewing assembly having a spinning filter basket mechanism according to one embodiment, the present invention is not so limited in this regard. Indeed, FIGS. 39-41 illustrate a self-cleaning brewing assembly 200 according to yet another embodiment of the present invention in which the filter basket does not spin during the brewing cycle, and yet provides a self-cleaning coffee chute and a specially designed water outlet, in order to maintain clean internal surfaces and thus a cleaner more pleasing brewed beverage/coffee.

Figure 39:
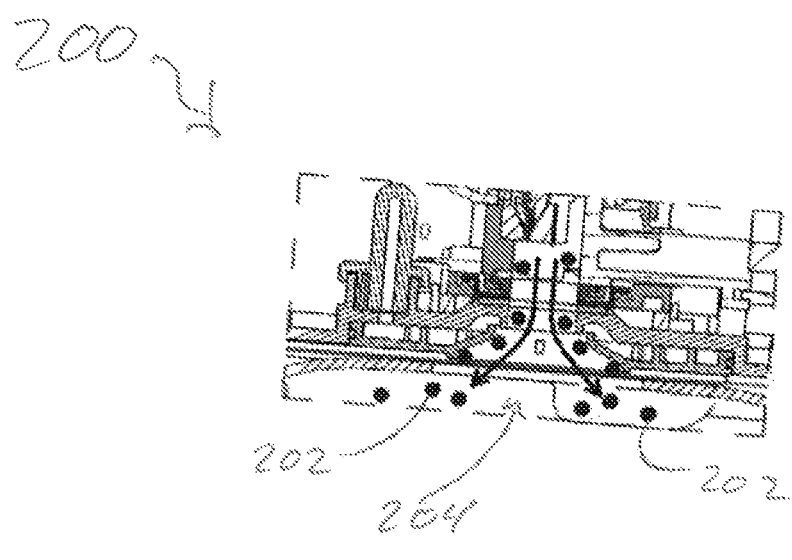
FIG. 39 illustrates a self-cleaning brewing assembly according to yet another embodiment of the present invention providing a self-cleaning coffee chute and a specially designed water outlet.
Figure 90:
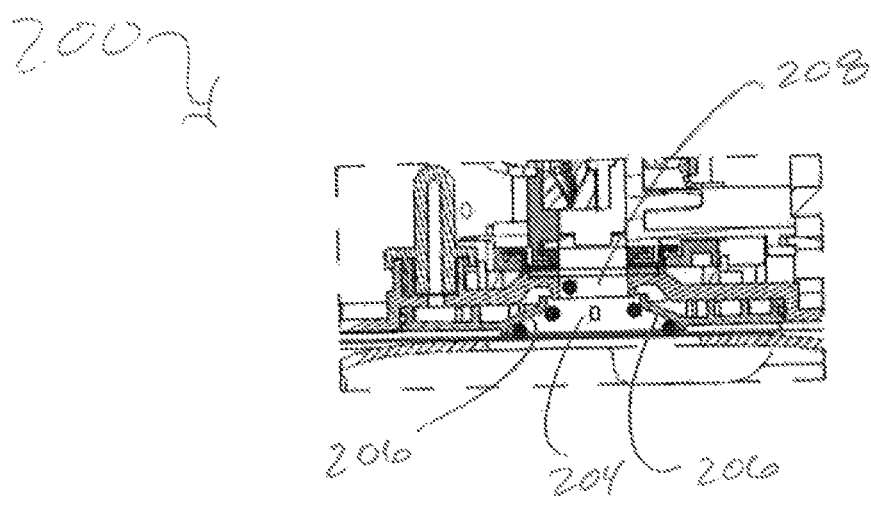

As illustrated in FIG. 39, once the whole coffee beans have been ground by the non-illustrated vertical burr grinder, including but not limited to the vertical burr grinder shown in connection with FIGS. 1-38, the ground coffee 202 is then deposited into the filter and brewing chamber 204. As further illustrated in FIG. 40, the ground coffee 202 will adhere, by static electricity, moisture or other natural mechanism, to the interior walls 206 of the of the ground coffee chute 208.

Figure 41:
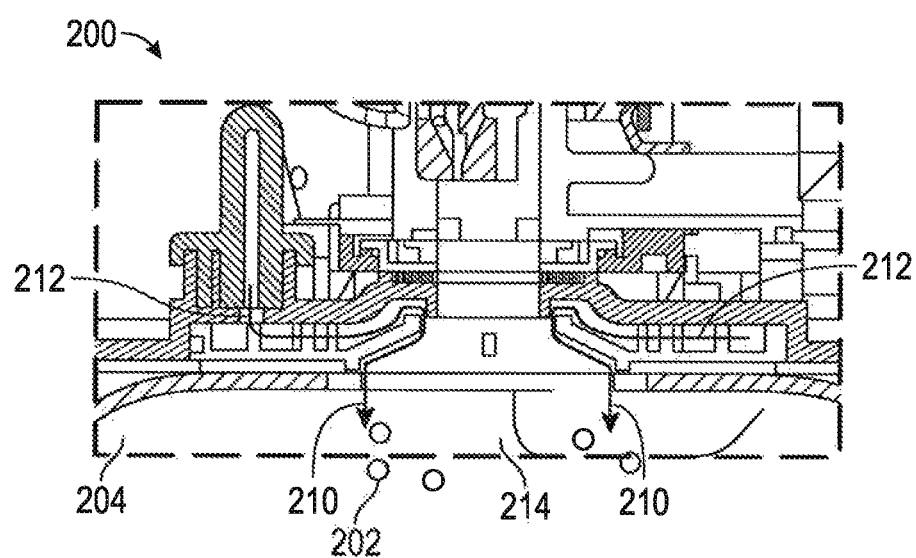
FIG. 41 illustrates a brew flow path in the assembly shown in FIG. 39.

Turning now to FIG. 41, a brew flow path 210 illustrates how the present invention keeps the interior walls 206 of the brewing assembly 200 clean, in between brewing cycles. As shown in FIG. 41, a brew flow path 210 is designed so as to funnel the incoming, typically heated, brewing liquid to enter the brewing chamber/filter 204 by contacting and running along the same interior walls 206 that the ground coffee 202 contacts when being deposited into the brewing chamber/filter 204. In doing so, the brewing liquid will contact and 'clean' the interior walls 206 of any ground coffee 202 particulates that may remain adhered to the interior walls 206 from the just-finished grinding process.

As further shown in FIG. 41, the flow path 210 of the brewing liquid includes an upturned portion 212 prior to the flow path being directed to the brewing chamber/filter 204. As will be appreciated, by including the upturned portion 212, the flow path 210 ensures that the brewing fluid will 'follow' the surface of the interior walls 206, instead of the water being directly deposited on the ground coffee in the filter, as is commonly seen in known brewing assemblies.

Indeed, another important aspect of the present invention is the particular annular outlet structure of the brewing assembly 200. As seen in FIG. 41, the flow path 210 of the brewing fluid, by virtue of running along and cleaning the interior walls 206, create an annular brewing outlet 214 in which the brewing fluid will enter the brewing chamber/filter 204 in an annular fashion, and not as a single, centralized stream.

Figure 42:
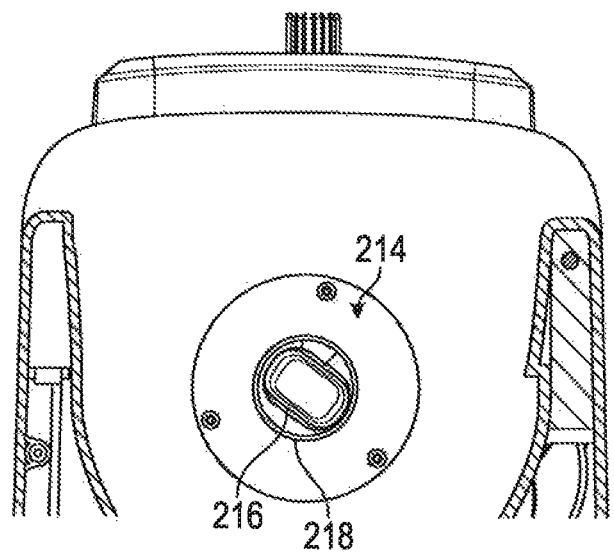
FIG. 42 illustrates a bottom-view of the annular brewing outlet of the assembly shown in FIG. 39.

FIG. 42 illustrates a bottom-view of the annular brewing outlet 214, showing the substantially annular configuration of the brewing fluid 216 as it enters the brewing chamber/filter 204. Additional structures may be selectively utilized to fashion an alternative, or complimentary, brew outlet 214, as shown by alternative or complimentary brew outlet 218.

As with therefore be readily appreciated, not only will the annular nature of the brewing outlet 214 rinse away and clean the internal passages of the brewing assembly 200, thus providing a self-cleaning function to the brewing assembly 200, but the annular nature of the brew outlet 214 additional provides an annular, or semi-annular, deposition of brewing fluid to the ground coffee below, thereby ensuring more uniform and timely soaking of the ground coffee in the brewing chamber/filter 204.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Those of ordinary skill will also understand that features from one embodiment may be integrated with features of another embodiment, without departing from the broader aspects of the present invention. Therefore, it is intended that the invention not be limited to the particular embodiments disclosed in the above detailed description, but that the invention will include all embodiments falling within the scope of this disclosure.

What is claimed is:

1. A coffee making appliance, comprising:
a housing having a base for supporting a container configured to receive brewed coffee;
a reservoir for receiving water to be heated;
a hopper configured to receive a quantity of whole coffee beans, said hopper having an outlet;
a vertically-oriented burr grinder positioned adjacent to said outlet of said hopper, said grinder being configured to transform said whole coffee beans into coffee grounds;
a filter removably received by said housing for receiving said coffee grounds from said grinder;
a channel directs said coffee grounds from said grinder into said filter; wherein said channel having a brewing outlet on one of its ends which is adjacent to said filter;
a pump configured to supply said water from said reservoir to said filter through a brewing path;
wherein said brew path directs said heated water over said brewing outlet, thereby cleaning said brewing outlet of particulates of said ground coffee.

2. A coffee making appliance, comprising:
a housing having a base for supporting a container configured to receive brewed coffee;
a reservoir for receiving water to be heated;
a hopper configured to receive a quantity of whole coffee beans, said hopper having an outlet;
a grinder positioned adjacent to said outlet of said hopper, said grinder being configured to transform said whole coffee beans into ground coffee, said ground coffee being deposited into a filter for brewing;
a pump configured to supply said water from said reservoir to said filter via a brew path; and
wherein said brew path includes an annual channel thereby causing said heated water to be supplied to said filter as an annular ring of said heated water.

3. A coffee making appliance, comprising:
a housing having a base for supporting a container for receiving brewed coffee;
a reservoir for housing water to be heated;
a hopper configured to receive a quantity of whole coffee beans, said hopper having an outlet;
a grinder positioned adjacent to said outlet of said hopper, said grinder being configured to selectively transform said whole coffee beans into ground coffee, said ground coffee being deposited into a filter for brewing;
a pump configured to supply said water from said reservoir to said filter via a brew path; and
wherein said brew path includes an annual channel adjacent said filter, thereby causing said heated water to be supplied to said filter as an annular ring of said heated water.

* * * * *